(12) United States Patent  
Oka

(10) Patent No.: US 11,184,383 B2  
(45) Date of Patent: Nov. 23, 2021

(54) SECURITY TEST SYSTEM, SECURITY TEST METHOD, FUNCTION EVALUATION DEVICE, AND PROGRAM

(71) Applicant: Robert Bosch GmbH, Stuttgart (DE)

(72) Inventor: Dennis-Kengo Oka, Kanagawa (JP)

(73) Assignee: ETAS GmbH, Stuttgart (DE)

( * ) Notice: Subject to any disclaimer, the term of this patent is extended or adjusted under 35 U.S.C. 154(b) by 242 days.

(21) Appl. No.: 16/304,437

(22) PCT Filed: May 3, 2017

(86) PCT No.: PCT/IB2017/052566  
§ 371 (c)(1),  
(2) Date: Nov. 26, 2018

(87) PCT Pub. No.: WO2017/203375  
PCT Pub. Date: Nov. 30, 2017

(65) Prior Publication Data  
US 2019/0141074 A1 May 9, 2019

(30) Foreign Application Priority Data

May 27, 2016 (JP) .............................. JP2016-106194  
Nov. 14, 2016 (JP) .............................. JP2016-221268

(51) Int. Cl.  
*H04L 29/06* (2006.01)  
*H04L 29/08* (2006.01)  
(Continued)

(52) U.S. Cl.  
CPC .......... *H04L 63/1433* (2013.01); *G06F 21/57* (2013.01); *H04L 43/50* (2013.01);  
(Continued)

(58) Field of Classification Search  
CPC ..... H04L 63/1433; H04L 43/50; H04L 63/00; H04L 63/1408; H04L 67/12; H04W 4/48; G06F 21/57; G05B 23/027  
See application file for complete search history.

(56) References Cited

U.S. PATENT DOCUMENTS

| | | | | |
|---|---|---|---|---|
| 5,515,504 A | * | 5/1996 | Le Van Suu | H04L 29/06 714/28 |
| 5,566,092 A | * | 10/1996 | Wang | G07C 3/00 702/185 |

(Continued)

FOREIGN PATENT DOCUMENTS

| | | |
|---|---|---|
| JP | 2014229301 | 12/2014 |
| JP | 2015075808 | 4/2015 |

(Continued)

OTHER PUBLICATIONS

Vrizlynn L et al., Autonomous Vehicle Security: A Taxonomy of Attacks and Defences, IEEE (Year: 2016).*

(Continued)

*Primary Examiner* — Shanto Abedin  
(74) *Attorney, Agent, or Firm* — Michael Best & Friedrich LLP

(57) ABSTRACT

A security test can be performed on an ECU by using random test signals without changing the ECU. A security test system for a control device for an on-vehicle network, includes a security test unit that includes a test signal transmission portion transmitting random test signals including an illegal signal, for diagnosing security of a control device for an on-vehicle network, and a diagnosis portion specifying the illegal signal on the basis of a process result in the control device using the test signals, and a function evaluation unit that includes a process information acquisition portion acquiring information regarding the process result in the control device, an abnormality detection (Continued)

portion detecting abnormality in the process result in the control device based on the test signal, and an abnormality information output portion outputting information regarding the detected abnormality.

16 Claims, 18 Drawing Sheets

(51) Int. Cl.
    *H04W 4/48*         (2018.01)
    *G06F 21/57*        (2013.01)
    *H04L 12/26*        (2006.01)

(52) U.S. Cl.
    CPC .......... *H04L 63/00* (2013.01); *H04L 63/1408* (2013.01); *H04L 67/12* (2013.01); *H04W 4/48* (2018.02); *G06F 2221/034* (2013.01)

(56) References Cited

U.S. PATENT DOCUMENTS

| | | | |
|---|---|---|---|
| 5,583,383 A * | 12/1996 | Denz | B60R 25/04 |
| | | | 307/10.2 |
| 7,010,459 B2 * | 3/2006 | Eryurek | G01F 1/3209 |
| | | | 700/174 |
| 9,677,529 B2 * | 6/2017 | Ohsaki | B60L 15/2009 |
| 9,721,399 B2 * | 8/2017 | Ishikawa | G07C 5/008 |
| 2002/0012325 A1 * | 1/2002 | Kikkawa | H04L 41/0677 |
| | | | 370/311 |
| 2005/0072239 A1 * | 4/2005 | Longsdorf | G05B 23/027 |
| | | | 73/649 |
| 2005/0096873 A1 * | 5/2005 | Klein | G01M 13/028 |
| | | | 702/184 |
| 2005/0210337 A1 * | 9/2005 | Chester | G05B 23/0254 |
| | | | 714/47.2 |
| 2008/0065705 A1 * | 3/2008 | Miller | G05B 23/0221 |
| 2008/0071441 A1 * | 3/2008 | Nishigaki | F02D 41/062 |
| | | | 701/105 |
| 2014/0047275 A1 * | 2/2014 | Eddington | G06F 11/0766 |
| | | | 714/37 |
| 2014/0082419 A1 | 3/2014 | Untinen et al. | |
| 2014/0102219 A1 * | 4/2014 | Kuwahara | B62D 5/0481 |
| | | | 73/862.333 |
| 2014/0351643 A1 * | 11/2014 | Lee | G06F 11/3668 |
| | | | 714/31 |
| 2015/0101036 A1 | 4/2015 | Kojima et al. | |
| 2016/0188876 A1 * | 6/2016 | Harris | G06F 21/554 |
| | | | 726/23 |
| 2017/0305368 A1 * | 10/2017 | Markham | B60R 16/0231 |

FOREIGN PATENT DOCUMENTS

| | | |
|---|---|---|
| WO | 2015170526 A1 | 11/2015 |
| WO | 2016038816 A1 | 3/2016 |

OTHER PUBLICATIONS

Yi Lu Murphey et al., Multiple Signal Fault Detection Using Fuzzy Logic, Springer-Verlag (Year: 2003).*
International Search Report for Application No. PCT/IB2016/052566 dated Aug. 4, 2017 (English Translation, 3 pages).
Bayer, S et al., "Don't Fuss about Fuzzing: Fuzzing Controllers in Vehicular Networks," Nov. 12, 2015, 10 pages.

* cited by examiner

[FIG. 1]
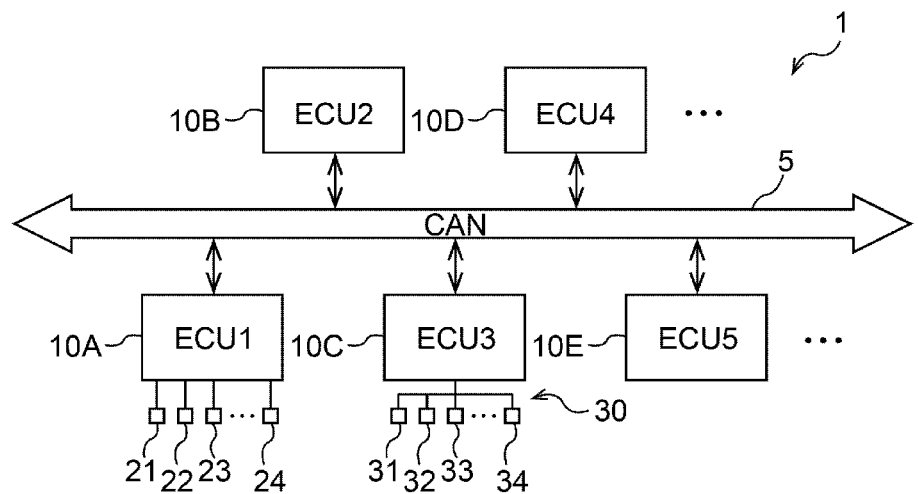
[FIG. 2]
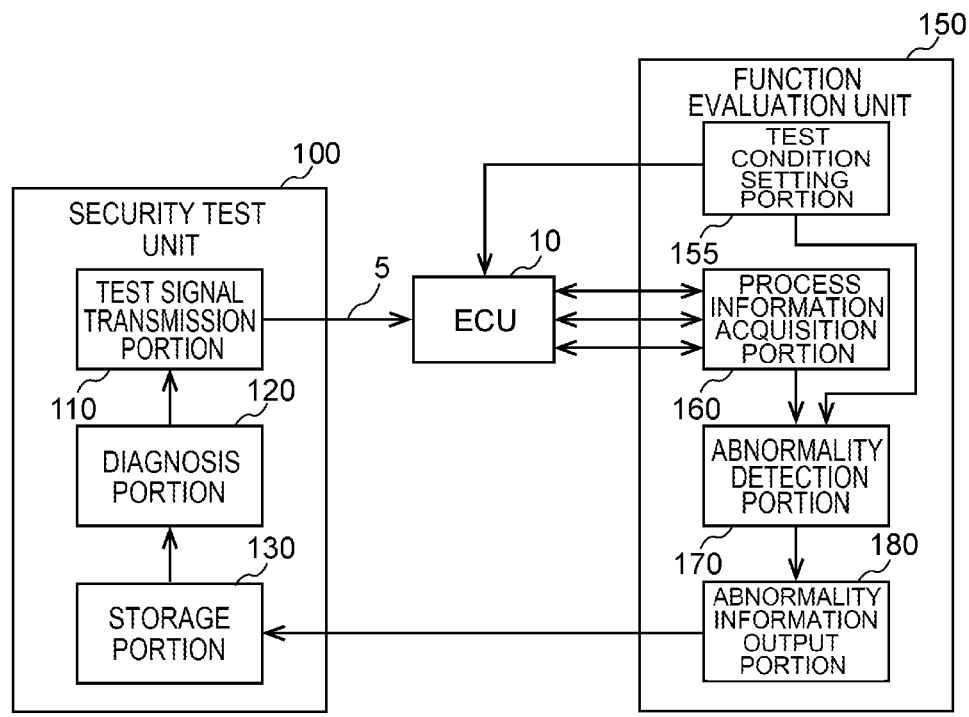

[FIG. 3]

| DETERMINATION TYPE | PROCESS RESULT INFORMATION | DIAGNOSIS PARAMETER | STATE | DETERMINATION RESULT |
|---|---|---|---|---|
| 1 | CAN MESSAGE OUTPUT FROM ECU | TRANSMISSION FREQUENCY fe | $fe \leq fe\_0$ | NORMAL |
|   |   |   | $fe > fe\_0$ | ABNORMAL |
| 2 | ANALOG/DIGITAL SIGNAL OUTPUT FROM ECU | VOLTAGE V | $V \leq V\_0$ | NORMAL |
|   | ANALOG/DIGITAL SIGNAL INPUT TO ECU |   | $V > V\_0$ | ABNORMAL |
| 3 | ANALOG/DIGITAL SIGNAL OUTPUT FROM ECU | OUTPUT/INPUT FREQUENCY fv | $fv \leq fv\_0$ | NORMAL |
|   | ANALOG/DIGITAL SIGNAL INPUT TO ECU |   | $fv > fv\_0$ | ABNORMAL |
| 4 | CAN MESSAGE OUTPUT FROM ECU | CHANGE AMOUNT $\Delta X$ OF PREDETERMINED VALUE PER UNIT TIME | $\Delta X \leq \Delta X\_0$ | NORMAL |
|   | ANALOG/DIGITAL SIGNAL OUTPUT FROM ECU |   |   |   |
|   | ANALOG/DIGITAL SIGNAL INPUT TO ECU |   | $\Delta X > \Delta X\_0$ | ABNORMAL |
| 5 | MEMORY VALUE | PREDETERMINED MEMORY ADDRESS VALUE Y | NOT OVERWRITTEN ON Y | NORMAL |
|   |   |   | OVERWRITTEN ON Y | ABNORMAL |

[FIG. 4]
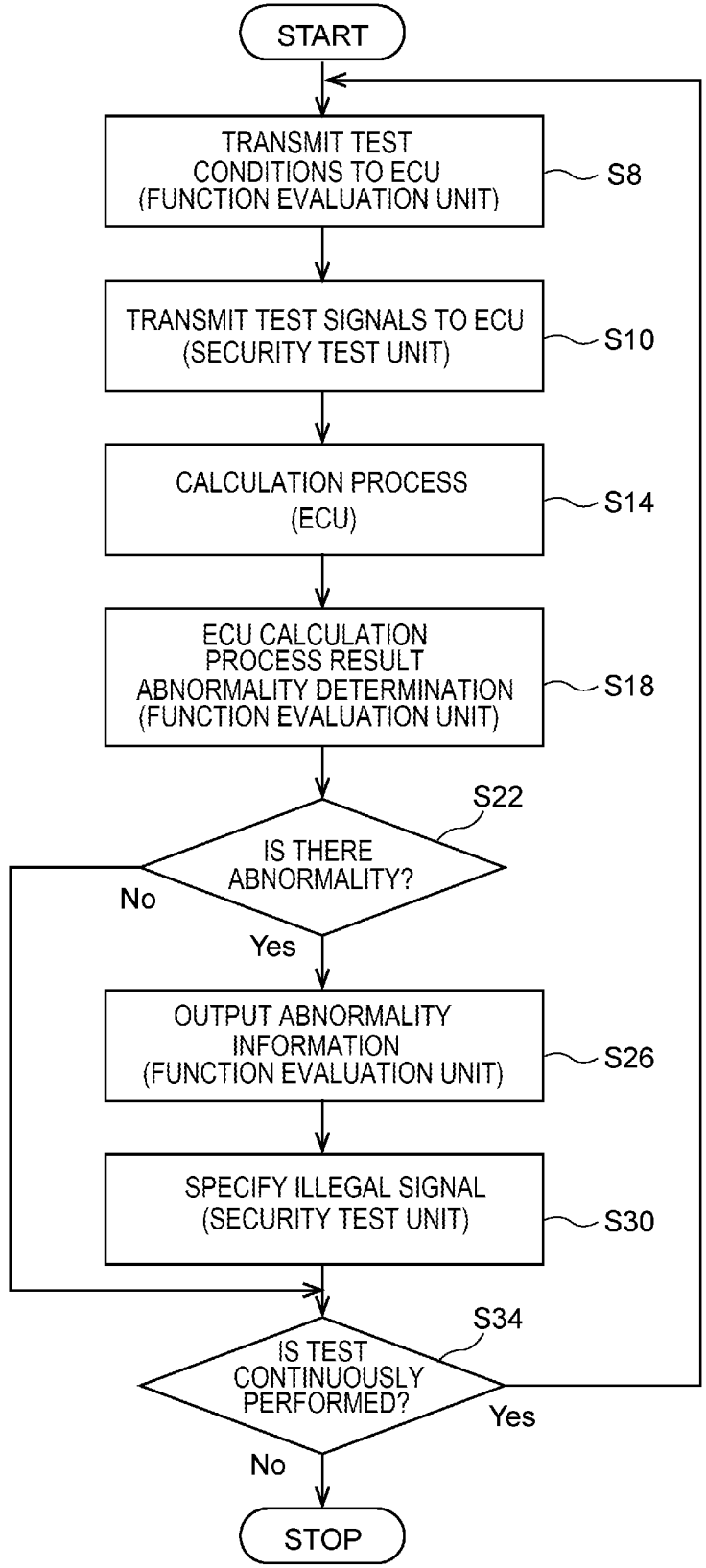

[FIG. 5]
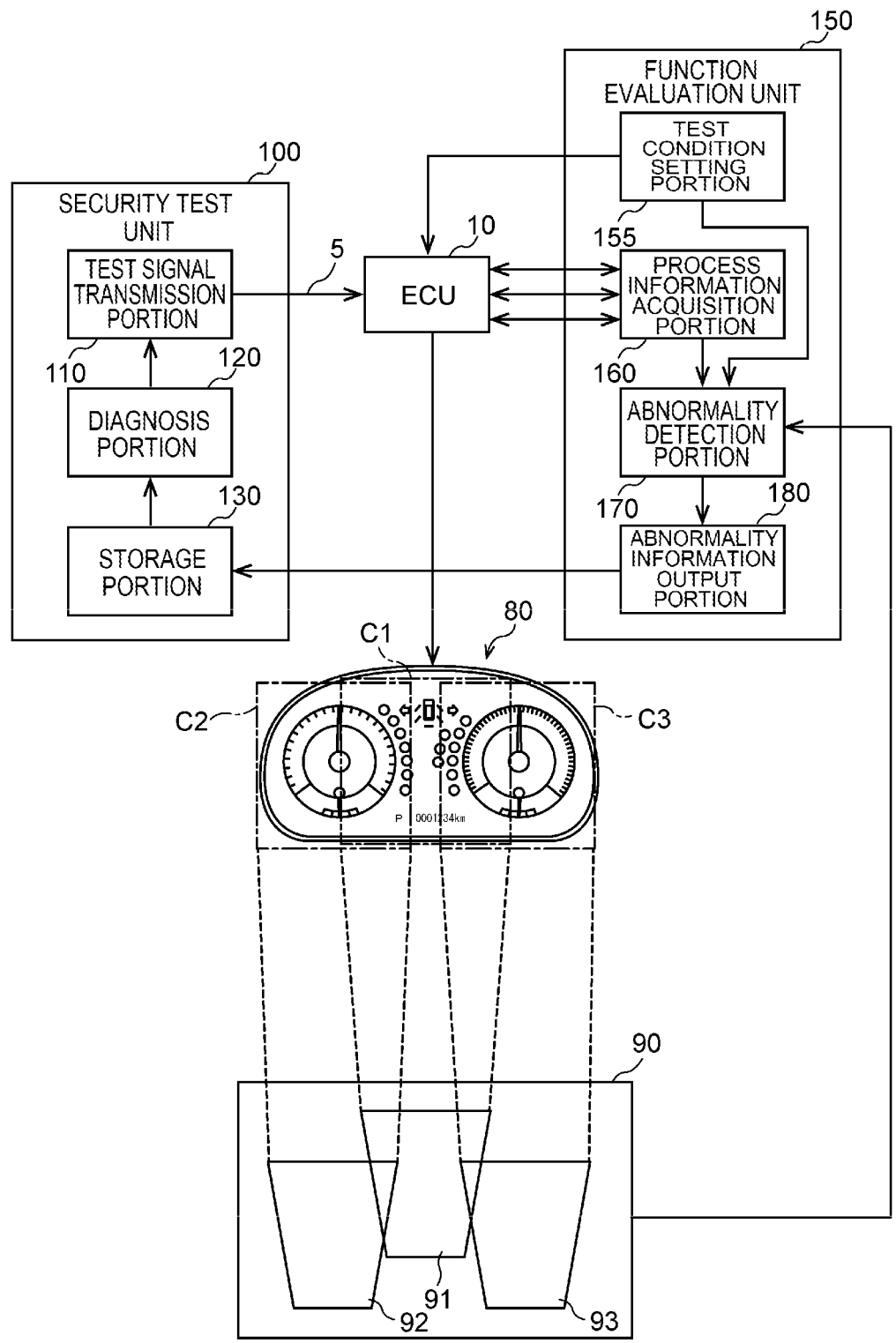

[FIG. 6]

| DETERMINATION TYPE | PROCESS RESULT INFORMATION | DIAGNOSIS PARAMETER | STATE | DETERMINATION RESULT |
|---|---|---|---|---|
| 1 | CAN MESSAGE OUTPUT FROM ECU | TRANSMISSION FREQUENCY fe | $fe \leqq fe\_0$ | NORMAL |
| 1 | CAN MESSAGE OUTPUT FROM ECU | TRANSMISSION FREQUENCY fe | $fe > fe\_0$ | ABNORMAL |
| 2 | ANALOG/DIGITAL SIGNAL OUTPUT FROM ECU | VOLTAGE V | $V \leqq V\_0$ | NORMAL |
| 2 | ANALOG/DIGITAL SIGNAL INPUT TO ECU | VOLTAGE V | $V > V\_0$ | ABNORMAL |
| 3 | ANALOG/DIGITAL SIGNAL OUTPUT FROM ECU | OUTPUT/INPUT FREQUENCY fv | $fv \leqq fv\_0$ | NORMAL |
| 3 | ANALOG/DIGITAL SIGNAL INPUT TO ECU | OUTPUT/INPUT FREQUENCY fv | $fv > fv\_0$ | ABNORMAL |
| 4 | CAN MESSAGE OUTPUT FROM ECU | CHANGE AMOUNT $\Delta X$ OF PREDETERMINED VALUE PER UNIT TIME | $\Delta X \leqq \Delta X\_0$ | NORMAL |
| 4 | ANALOG/DIGITAL SIGNAL OUTPUT FROM ECU | CHANGE AMOUNT $\Delta X$ OF PREDETERMINED VALUE PER UNIT TIME | | |
| 4 | ANALOG/DIGITAL SIGNAL INPUT TO ECU | CHANGE AMOUNT $\Delta X$ OF PREDETERMINED VALUE PER UNIT TIME | $\Delta X > \Delta X\_0$ | ABNORMAL |
| 4 | DISPLAY INSTRUMENT CLUSTER | CHANGE AMOUNT $\Delta X$ OF PREDETERMINED VALUE PER UNIT TIME | | |
| 5 | MEMORY VALUE | PREDETERMINED MEMORY ADDRESS VALUE Y | NOT OVERWRITTEN ON Y | NORMAL |
| 5 | MEMORY VALUE | PREDETERMINED MEMORY ADDRESS VALUE Y | OVERWRITTEN ON Y | ABNORMAL |
| 6 | DISPLAY INSTRUMENT CLUSTER | CONTRADICTION IN DISPLAY CONTENT | CONTRADICTION ABSENT | NORMAL |
| 6 | DISPLAY INSTRUMENT CLUSTER | CONTRADICTION IN DISPLAY CONTENT | CONTRADICTION PRESENT | ABNORMAL |

[FIG. 7]
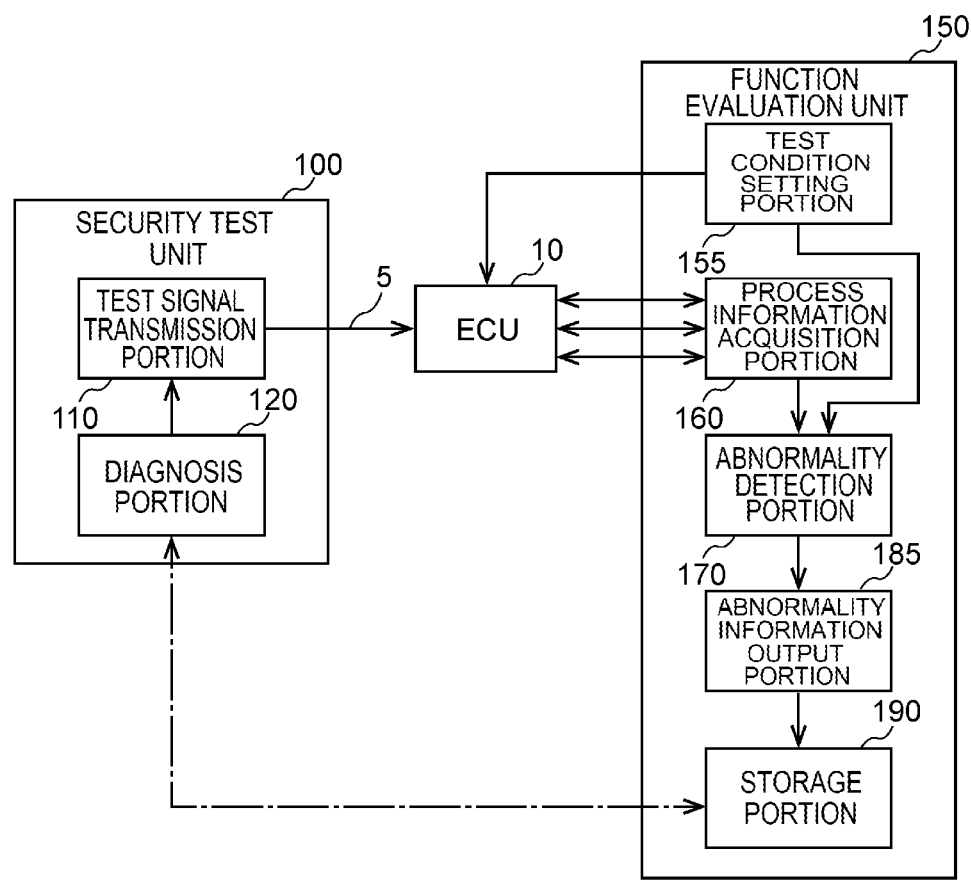

[FIG. 8]
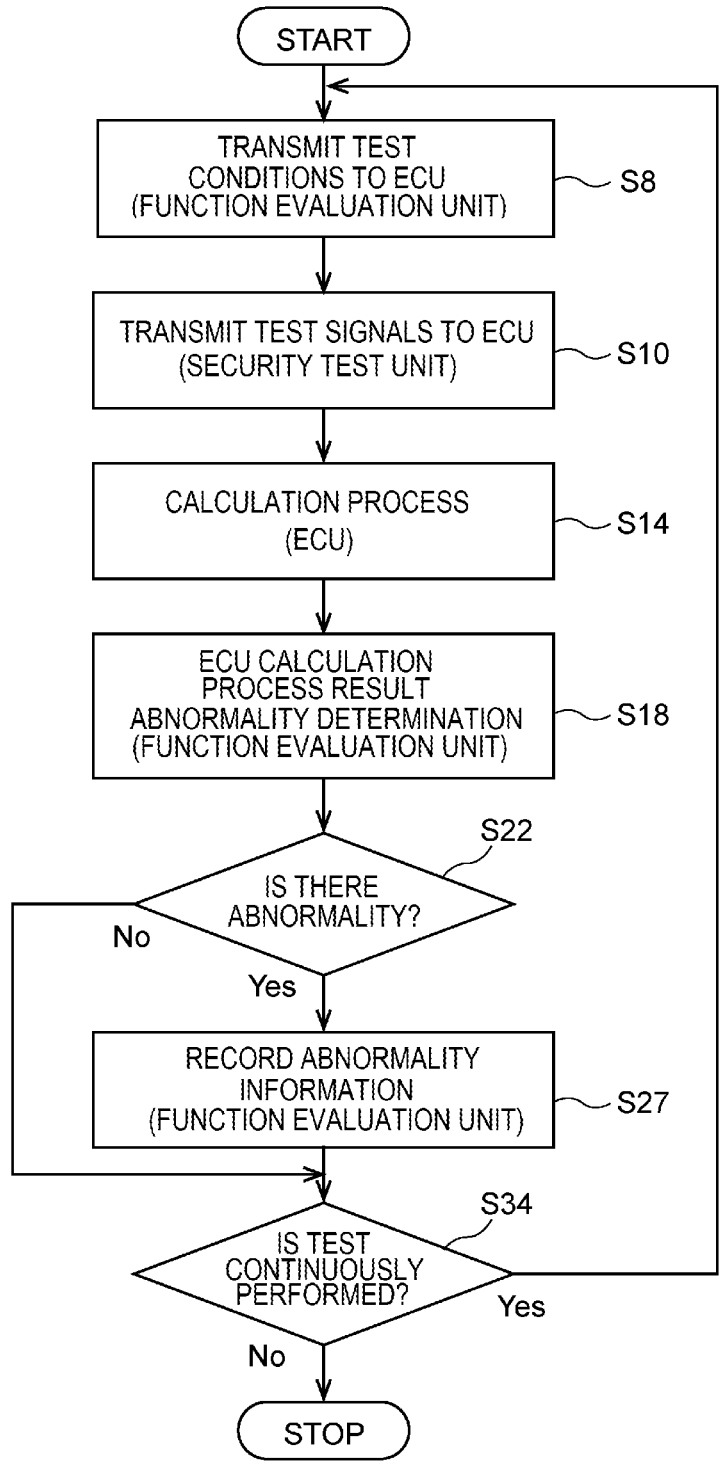

[FIG. 9]
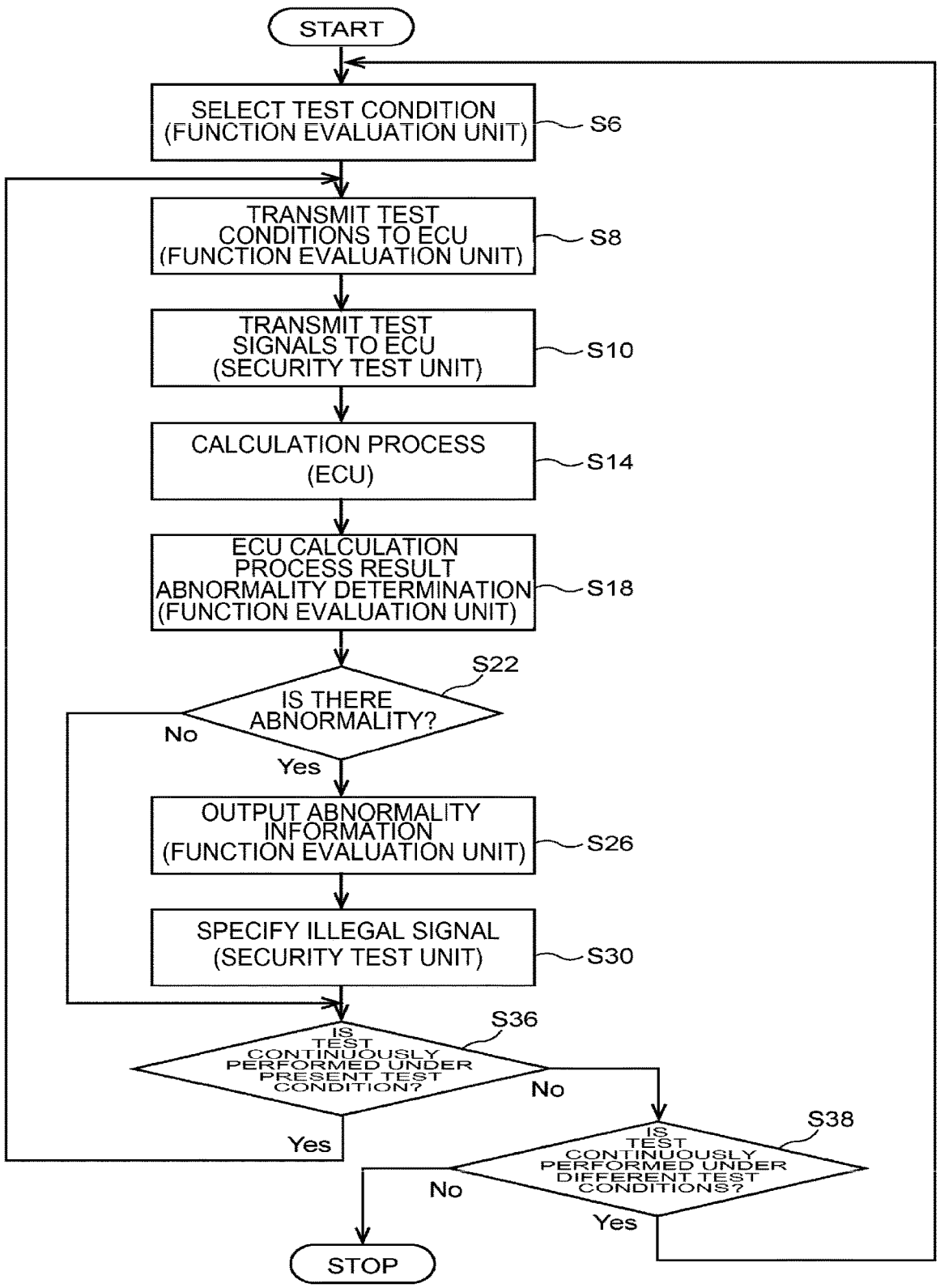

[FIG. 10]
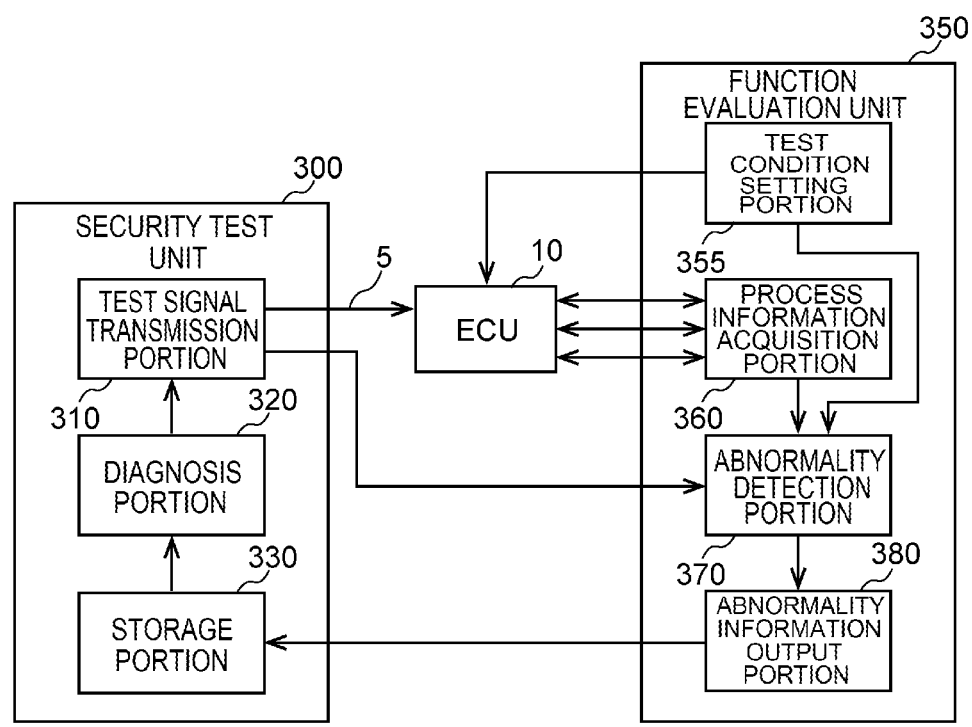

[FIG. 11]
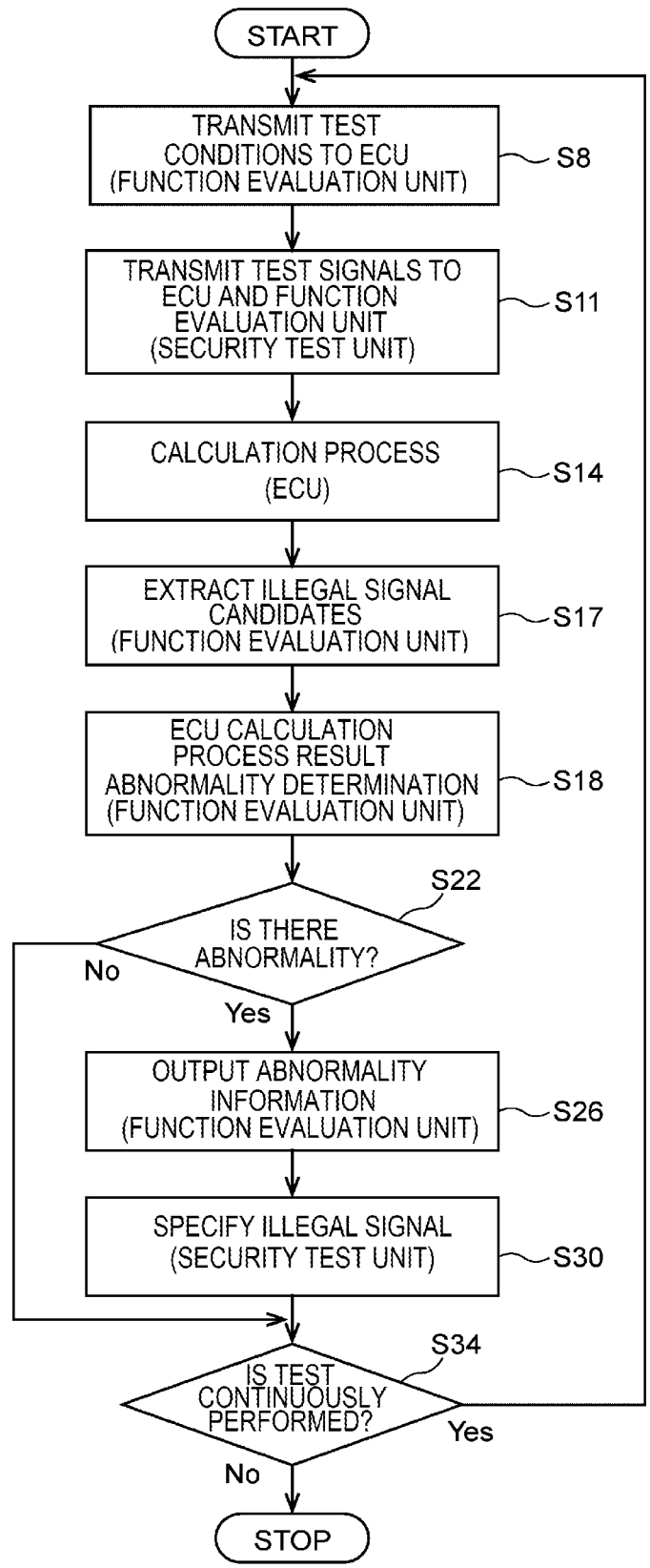

[FIG. 12]
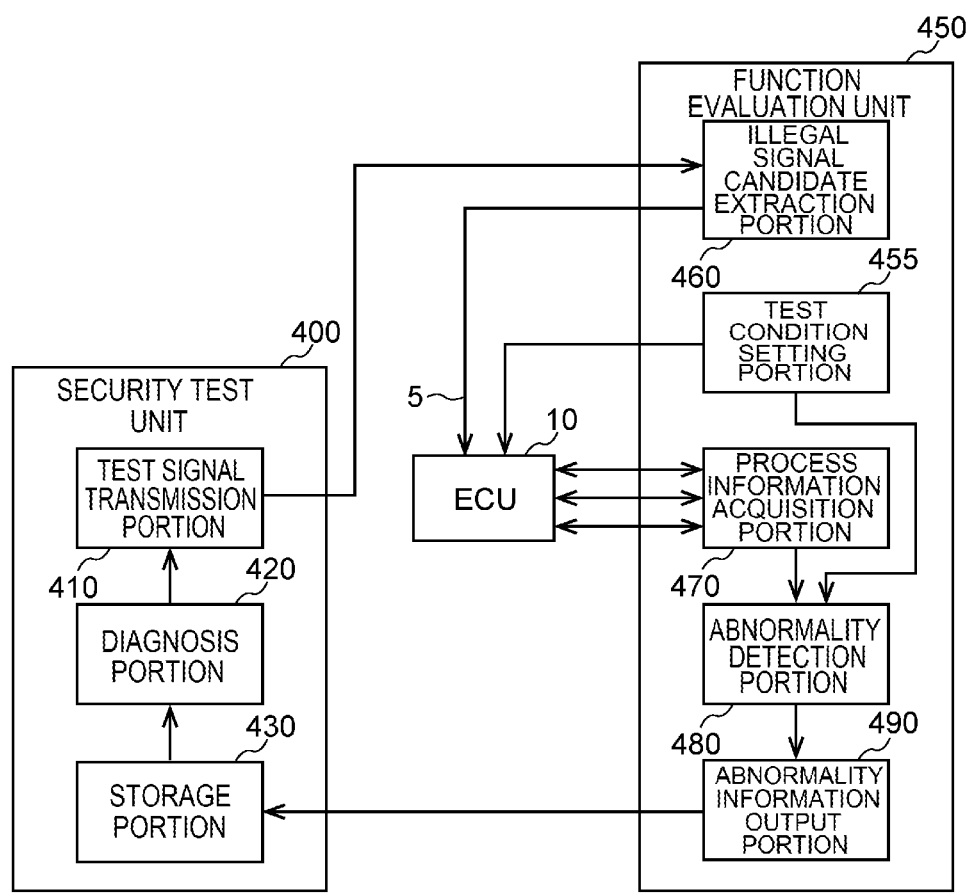

[FIG. 13]
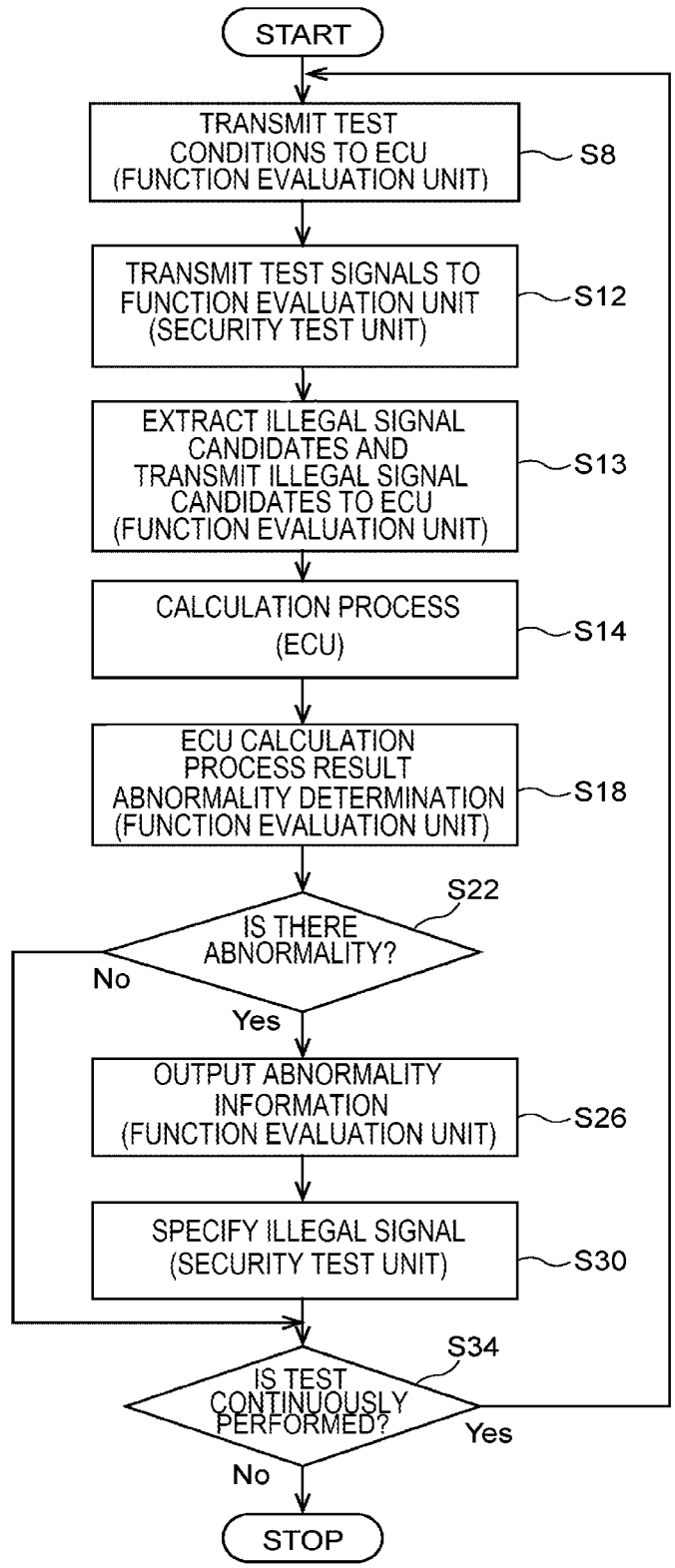

[FIG. 14]
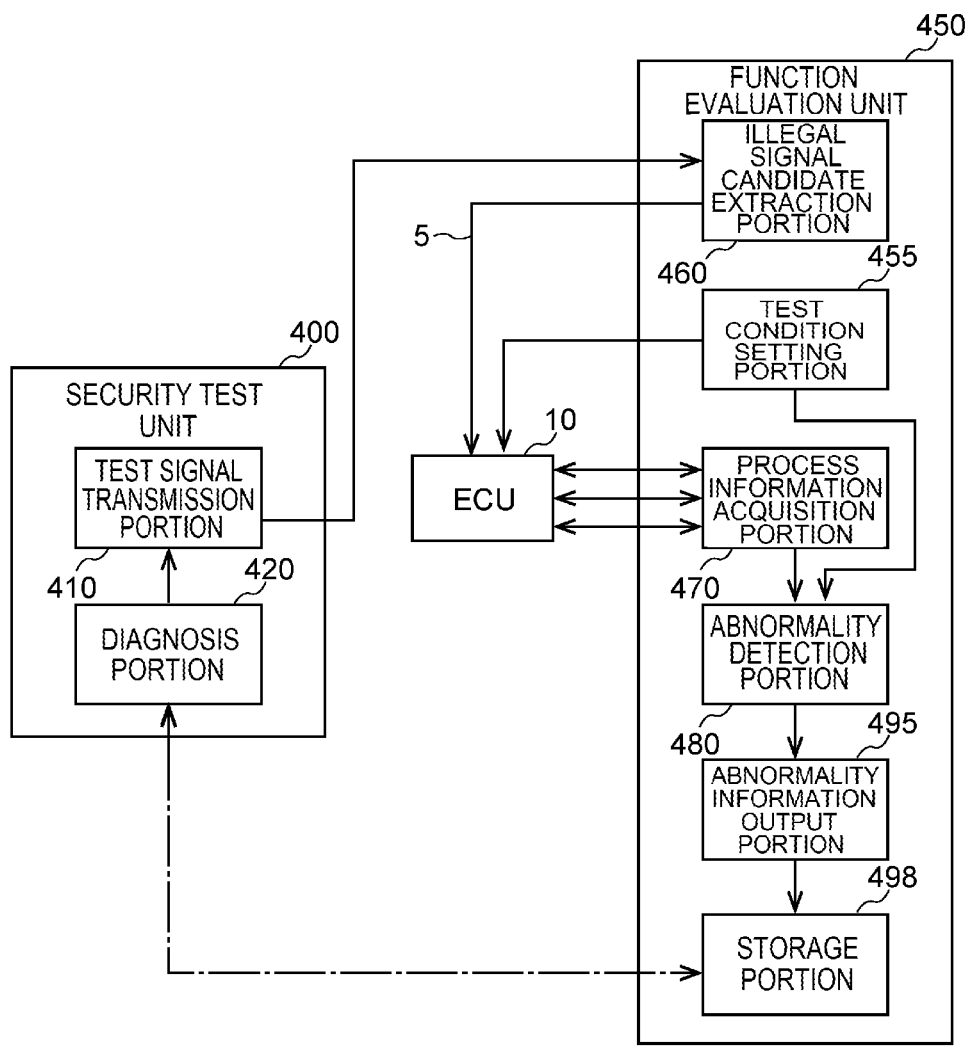

[FIG. 15]
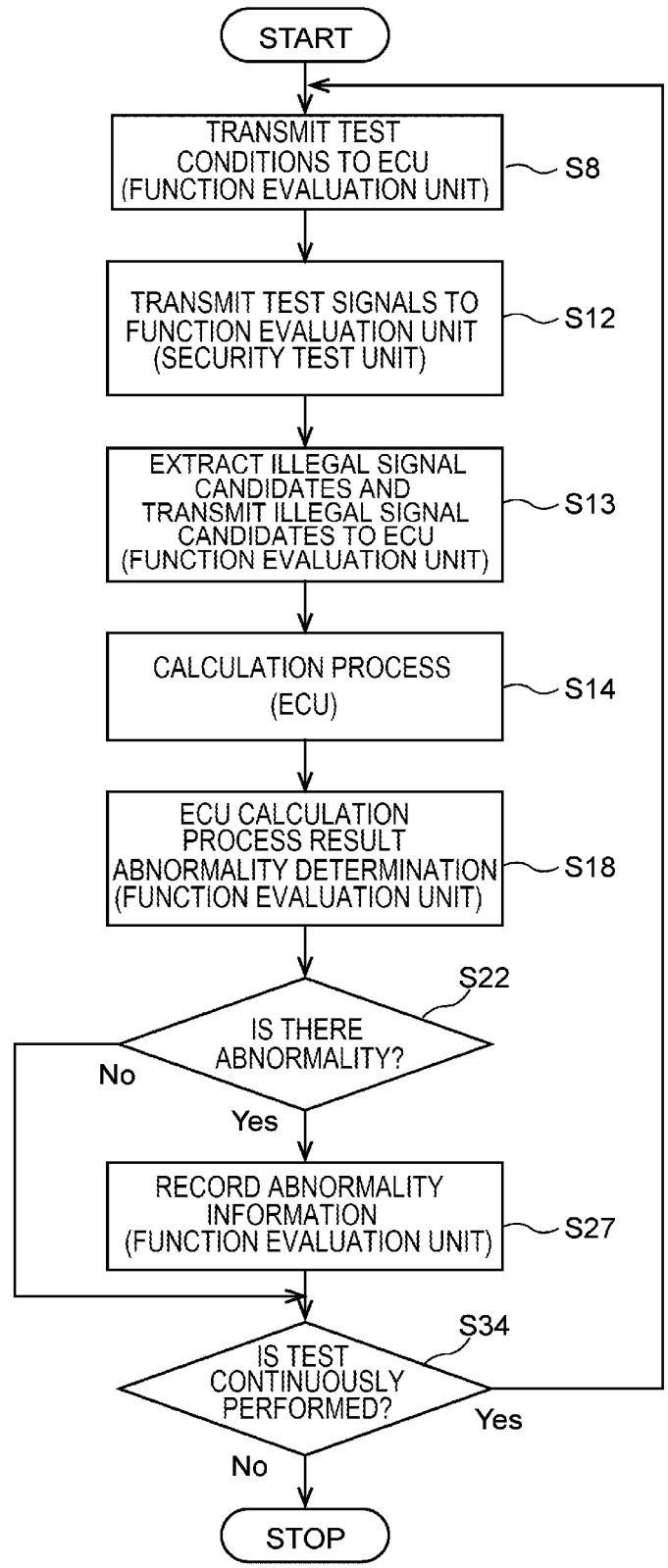

[FIG. 16]
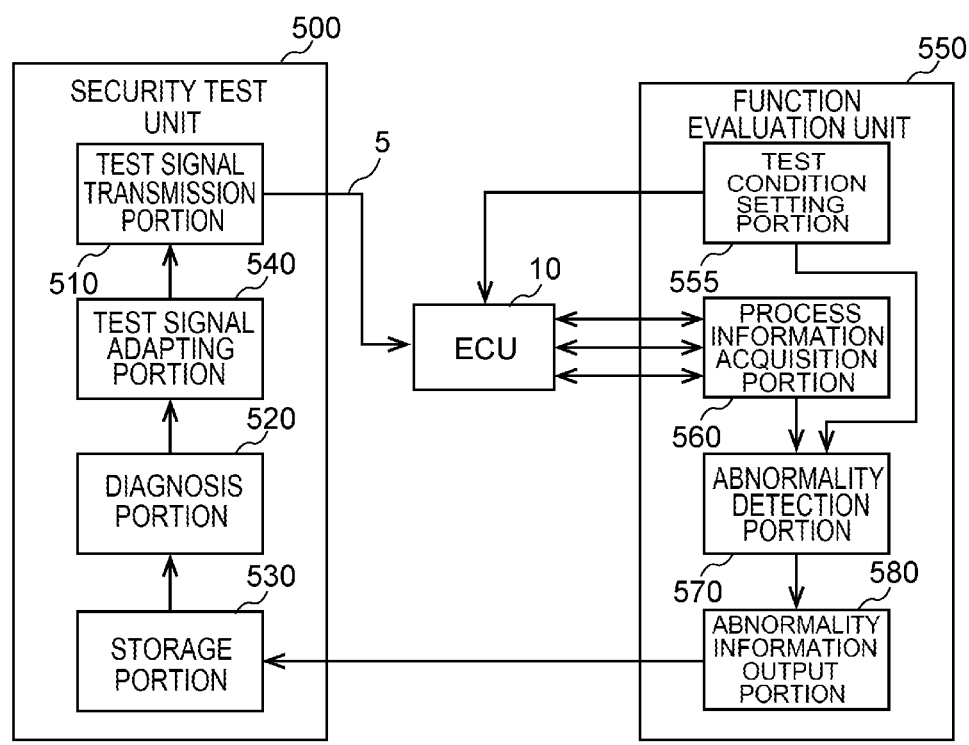

[FIG. 17]
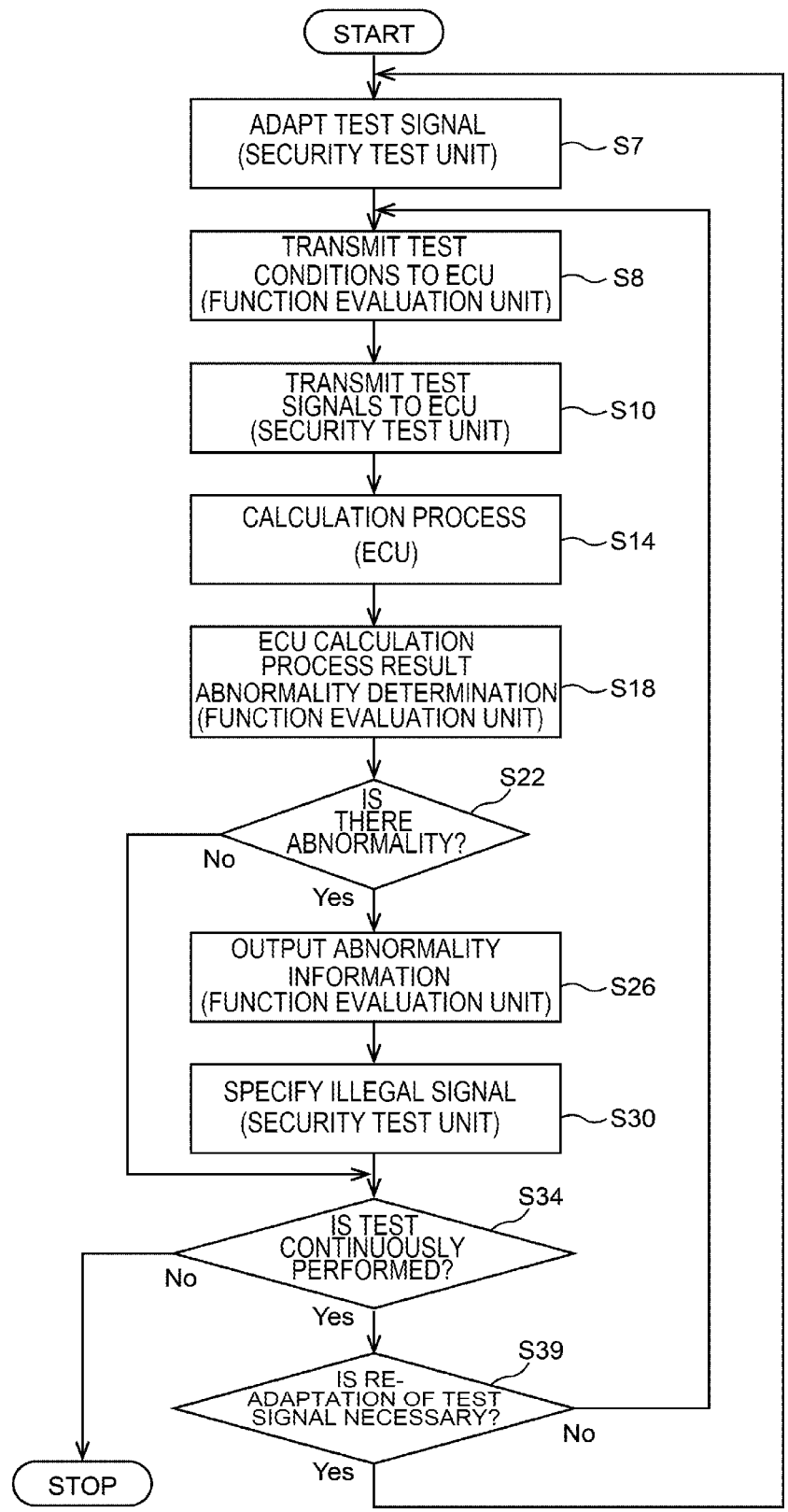

[FIG. 18]
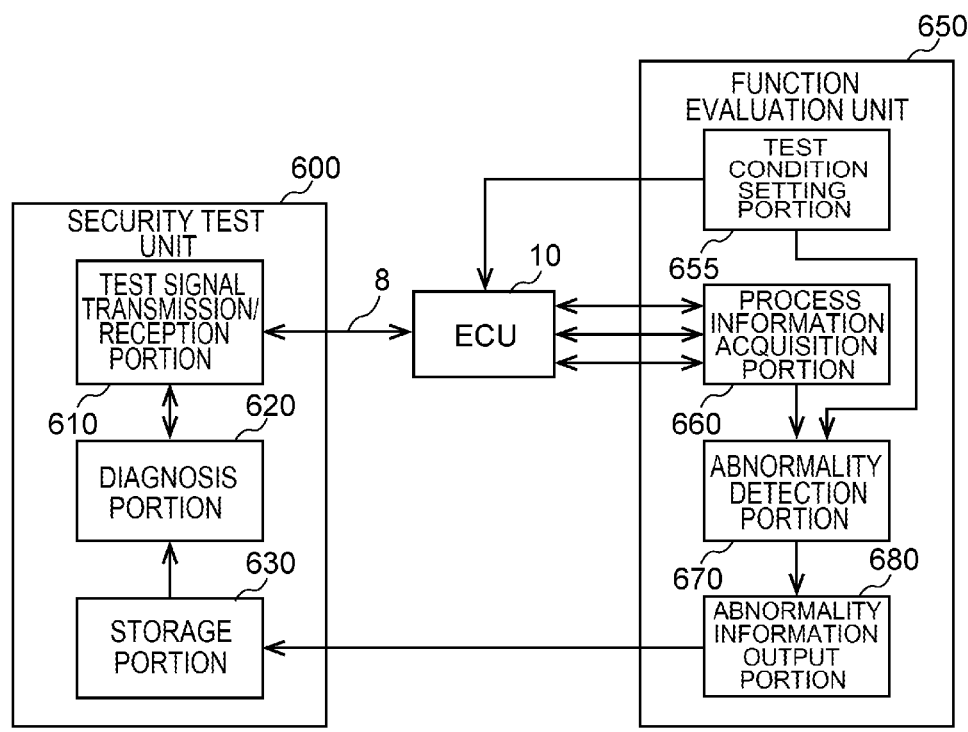

[FIG. 19]
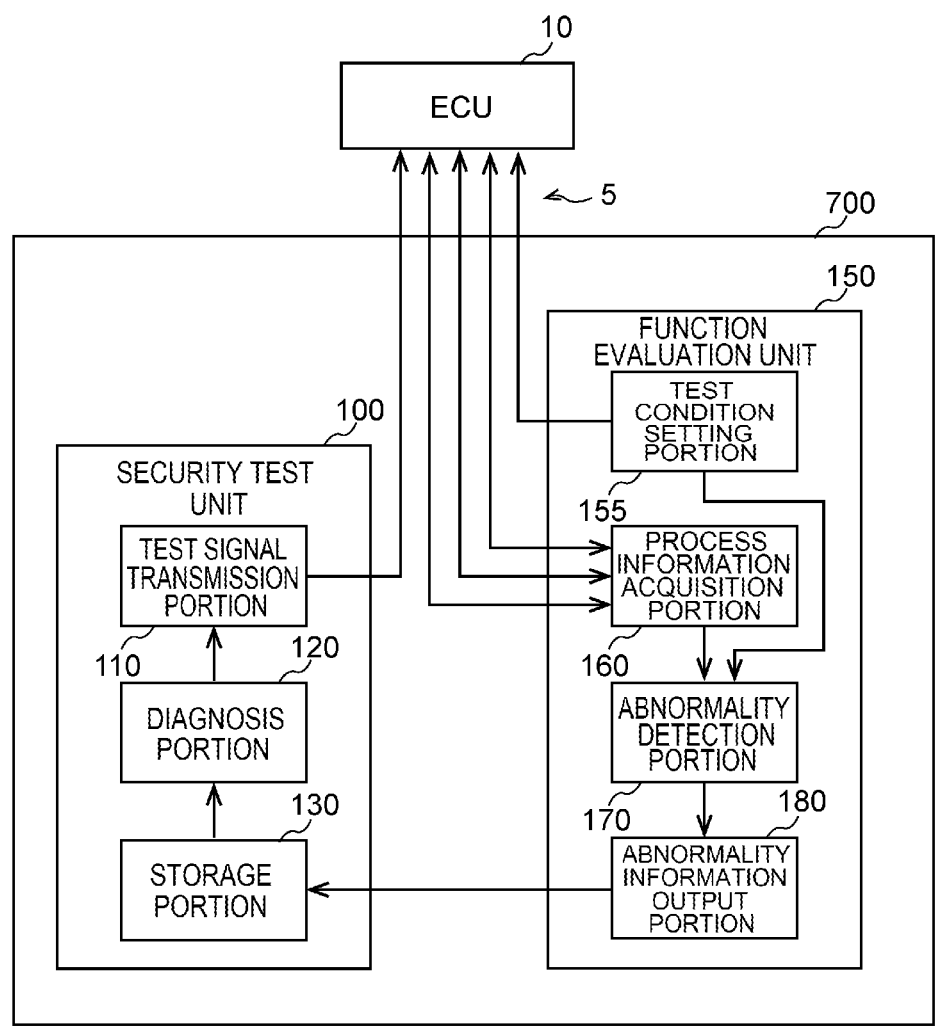

SECURITY TEST SYSTEM, SECURITY TEST METHOD, FUNCTION EVALUATION DEVICE, AND PROGRAM

BACKGROUND OF THE INVENTION

The present invention relates to a security test system and a security test method capable of performing a security test on a control device for an on-vehicle network, and a function evaluation device and a program which can be used for the security test system.

In the related art, as a test method for finding vulnerability of software, there is a method in which random test signals including an illegal signal are input to a device in which test target software can be executed, and an operation of the device at that time is monitored. Such a test method may include, for example, a fuzzing test. The fuzzing test is a test method performed in a so-called black box state in which an internal structure of software is not known, and a test device randomly transmits a large number of test signals to a test target device, and finds out vulnerability of software by receiving a calculation process result in the test target device and specifying an illegal signal (refer to JP-A-2014-229301 and JP-A-2015-75808).

SUMMARY OF THE INVENTION

Here, in an on-vehicle communication network having a controller area network (CAN) as a representative thereof, each control device (electronic control unit: ECU) on a network transmits a message (CAN message) to the network at an appropriate timing. In other words, there is no configuration in which the ECU on the network performs a calculation process on the basis of a test signal which is acquired from a test device via the network, and then a response to the test signal is returned to the test device. Therefore, such a test device is hardly to be applied to an ECU for an on-vehicle network.

Even if the ECU is configured to return a response to a test signal, related to a test result, to the test device, actually, it is hard to actually recognize whether or not the ECU exchanges abnormal signals with peripheral devices or other ECUs.

The present invention has been made in consideration of the above-described problem, and an object thereof is to provide a security test system and a security test method which are novel and improved, capable of performing a security test on an ECU by using random test signals without changing the ECU, and a function evaluation device and a program which can be used for the security test system.

In order to solve the above-described problem, according to an aspect of the present invention, there is provided a security test system for a control device for an on-vehicle network, including a security test unit that includes a test signal transmission portion transmitting random test signals including an illegal signal, for diagnosing security of a control device for an on-vehicle network, and a diagnosis portion specifying the illegal signal on the basis of a process result in the control device using the test signals; and a function evaluation unit that includes a process information acquisition portion acquiring information regarding the process result in the control device, an abnormality detection portion detecting abnormality in the process result in the control device based on the test signal, and an abnormality information output portion outputting information regarding the detected abnormality.

According to the security test system related to the present invention, the function evaluation unit which is used separately from the security test unit in the related art and performs functional evaluation on a process result in the control device (ECU) includes an abnormality information output portion that outputs abnormality information which may be used for a security test in the security test unit. Thus, the security test unit can diagnose security of the control device by using the abnormality information output from the abnormality information output portion of the function evaluation unit without changing the control device.

The security test unit may further include a test signal adapting portion that sets the random test signals which are subsequently transmitted on the basis of test results obtained until right before.

The function evaluation unit may further include a test condition setting portion that sets states in which the control device may be placed on the on-vehicle network as test conditions, and transmits the test conditions to the control device.

The test signal transmission portion of the security test unit may transmit the test signals to the control device and the function evaluation unit, and the abnormality information output portion of the function evaluation unit excludes a test signal corresponding to a normal process result, and outputs information regarding a test signal corresponding to an abnormal process result.

The abnormality information output portion of the function evaluation unit may transmit the information regarding the abnormality to the security test unit.

The abnormality information output portion of the function evaluation unit may store the information regarding the abnormality in a storage portion provided in the function evaluation unit.

The on-vehicle network may be a controller area network (CAN), a local interconnect network (LIN), FlexRay, Media Oriented Systems Transport (MOST), CAN with Flexible Data rate (CAN-FD), or Automotive Ethernet.

In a case where a transmission frequency of an output signal which is output as a process result in the control device exceeds an expected frequency, the abnormality detection portion of the function evaluation unit may detect abnormality in the process result.

In a case where a voltage value of an analog signal or a digital signal as an output signal which is output as a process result in the control device or an input signal which is input to the control device is more than an expected upper limit or is lower than an expected lower limit, the abnormality detection portion of the function evaluation unit may detect abnormality in the process result.

In a case where a frequency of an analog signal or a digital signal as an output signal which is output as a process result in the control device or an input signal which is input to the control device exceeds an expected frequency, the abnormality detection portion of the function evaluation unit may detect abnormality in the process result.

The abnormality detection portion of the function evaluation unit may detect abnormality in a process result on the basis of imaging information obtained by imaging a display device which performs display control on the basis of the process result in the control device.

In a case where contradictory display on the display device is detected on the basis of the imaging information, the abnormality detection portion of the function evaluation unit may detect abnormality in the process result.

In a case where a change amount of a predetermined value per unit time related to a process result in the control device exceeds an expected threshold value, the abnormality detection portion of the function evaluation unit may detect abnormality in the process result.

In a case where an unchangeable value included in a memory address in the control device is overwritten as a process result in the control device, the abnormality detection portion of the function evaluation unit may detect abnormality in the process result.

According to another aspect of the present invention, there is provided a security test method for a control device for an on-vehicle network, including a step of causing a security test unit to transmit random test signals including an illegal signal, for diagnosing security of a control device for an on-vehicle network; a step of causing a function evaluation unit to acquire information regarding a process result in the control device; a step of causing the function evaluation unit to detect abnormality in a process result in the control device based on the test signal; a step of causing the function evaluation unit to store information regarding the detected abnormality or transmit the information regarding the detected abnormality to the security test unit; and a step of causing the security test unit to specify the illegal signal on the basis of the process result in the control device based on the test signal.

According to still another aspect of the present invention, there is provided a function evaluation device for a control device for an on-vehicle network, including a process information acquisition portion that acquires information regarding a process result in a control device for an on-vehicle network; an abnormality detection portion that detects abnormality in a process result in the control device due to random test signals including an illegal signal, the random test signals being transmitted to the control device from a security test unit diagnosing security of the control device via the on-vehicle network; and an abnormality information output portion that outputs information regarding the detected abnormality.

According to still another aspect of the present invention, there is provided a program causing a computer to function as a process information acquisition portion that acquires information regarding a process result in a control device for an on-vehicle network; an abnormality detection portion that detects abnormality in a process result in the control device due to random test signals including an illegal signal, the random test signals being transmitted to the control device from a security test unit diagnosing security of the control device via the on-vehicle network; and an abnormality information output portion that outputs information regarding the detected abnormality.

As described above, according to the present invention, it is possible to perform a security test on an ECU by using random test signals without changing the ECU.

BRIEF DESCRIPTION OF THE DRAWINGS

FIG. 1 is a schematic diagram illustrating a configuration example of an on-vehicle network including a test target ECU according to the present invention.

FIG. 2 is a schematic diagram illustrating a configuration example of a security test system according to a first embodiment.

FIG. 3 is a diagram for explaining an abnormality determination method in the security test system according to the same embodiment.

FIG. 4 is a diagram for explaining an example of a flowchart related to a process performed by the security test system according to the same embodiment.

FIG. 5 is a schematic diagram illustrating a configuration example of a security test system according to a first modification example of the same embodiment.

FIG. 6 is a diagram for explaining an abnormality determination method in the security test system according to the first modification example of the same embodiment.

FIG. 7 is a schematic diagram illustrating a configuration example of a security test system according to a second modification example of the same embodiment.

FIG. 8 is an explanatory diagram illustrating an example of a flowchart related to a process performed by the security test system according to the second modification example of the same embodiment.

FIG. 9 is an explanatory diagram illustrating an example of a flowchart related to a process performed by a security test system according to a third modification example of the same embodiment.

FIG. 10 is a schematic diagram illustrating a configuration example of a security test system according to a second embodiment.

FIG. 11 is a diagram for explaining an example of a flowchart related to a process performed by the security test system according to the same embodiment.

FIG. 12 is a schematic diagram illustrating a configuration example of a security test system according to a third embodiment.

FIG. 13 is a diagram for explaining an example of a flowchart related to a process performed by the security test system according to the same embodiment.

FIG. 14 is a schematic diagram illustrating a configuration example of a security test system according to a modification example of the same embodiment.

FIG. 15 is a diagram for explaining an example of a flowchart related to a process performed by the security test system according to the modification example of the same embodiment.

FIG. 16 is a schematic diagram illustrating a configuration example of a security test system according to a fourth embodiment.

FIG. 17 is a diagram for explaining an example of a flowchart related to a process performed by the security test system according to the same embodiment.

FIG. 18 is a schematic diagram illustrating a configuration example of a security test system according to a fifth embodiment.

FIG. 19 is a schematic diagram illustrating another configuration example of the security test system.

DETAILED DESCRIPTION

Hereinafter, preferred embodiments of the present invention will be described with reference to the accompanying drawings. In the present specification and the drawings, constituent elements having the substantially same functional configuration are given the same reference numeral, and repeated description will be omitted.

1. First Embodiment

1-1. On-Vehicle Network

First, with reference to FIG. 1, a brief description will be made of a configuration example of an on-vehicle communication network (hereinafter, also referred to as an "on-vehicle network") including an ECU (control device) to which a security test performed by a security test system according to a first embodiment can be applied. FIG. 1 illustrates an on-vehicle network 1 connected to a plurality of ECUs 10A to 10E mounted on a passenger vehicle or a commercial vehicle.

The plurality of ECUs 10A to 10E are, for example, an engine control unit controlling an engine of the vehicle, a transmission control unit controlling an automatic transmission, a motor control unit controlling a drive motor or a generation motor of a hybrid vehicle, a battery control unit controlling a high voltage battery of a hybrid vehicle, a hybrid control unit collectively controlling drive force or regenerative force of a hybrid vehicle, a body control unit controlling an instrument panel, door locks, power windows, and the like, and an airbag control unit controlling an airbag device.

Each of the ECUs 10A to 10E is connected to peripheral devices such as various actuators or sensors required to control each control target. The ECUs 10A to 10E transmit signals to the peripheral devices on the basis of calculation process results, or receive sensor signals from the peripheral devices. For example, such as peripheral devices 21 to 24 connected to the ECU 10A, the peripheral devices 21 to 24 may be individually connected to the ECU 10A. Alternatively, such as peripheral devices 31 to 34 connected to the ECU 10C, the peripheral devices 31 to 34 may be connected to the ECU 10C via sub-network 30 such as a local interconnect network (LIN).

Each of the ECUs 10A to 10E is configured to include a communication circuit connected to a communication bus 5, a central processing unit (CPU), and storage elements such as a random access memory (RAM) and a read only memory (ROM). The ROM stores, for example, a program executed by the CPU, or information such as parameters used for a calculation process in the program. The RAM stores, for example, a calculation process result in the CPU, or information regarding signals transmitted to various peripheral devices or signals received from various peripheral devices.

The plurality of ECUs 10A to 10E are connected to the communication bus 5, and can transmit and receive information to and from each other via the communication bus 5. The on-vehicle network 1 according to the present embodiment is built as a controller area network (CAN) system, and the plurality of ECUs 10A to 10E can transmit and receive information to and from each other by transmitting and receiving CAN messages via the communication bus 5.

Each of the ECUs 10A to 10E transmits the CAN message to the communication bus 5 in order to share information acquired or calculated by the ECU with other ECUs. The CAN message may be set to be transmitted at a predetermined time interval. An ECU having received the CAN message from another ECU may control a control target by using information included in the CAN message.

In the present embodiment, even if a CAN message transmitted from a certain ECU is received by another ECU, and a calculation process is performed, no message is returned to the ECU which is a transmission source in response to the transmitted CAN message.

The number of ECUs connected to the on-vehicle network 1 is not limited. A device connected to the communication bus 5 is not limited to an ECU, and various peripheral devices each including a communication circuit connected to the communication bus 5 and a drive circuit may be connected thereto. The on-vehicle network 1 is built as a CAN system, but the on-vehicle network 1 may be a local interconnect network (LIN), FlexRay, Media Oriented Systems Transport (MOST), CAN with Flexible Data rate (CAN-FD), or Automotive Ethernet. Signals transmitted and received via the communication bus 5 are configured according to a standard of the on-vehicle network 1. Communication performed between each of the ECUs 10A to 10E and the communication bus 5 is not limited to wired communication, and may be wireless communication.

1-2. Security Test System 1-2-1. Entire Summary

Next, a description will be made of a security test system according to the present embodiment which tests vulnerability to security of the ECUs 10A to 10E (hereinafter, referred to as the "ECUs 10" in a case where the ECUs are not necessarily required to be differentiated from each other) on the on-vehicle network 1. As described above, a plurality of ECUs 10 and the like are present on the on-vehicle network 1, and an additional ECU or various peripheral devices can be connected to the on-vehicle network 1 so as to cope with diversification of functions of the vehicle. In each of the ECUs 10, security for an illegal signal should be ensured so that an abnormal control operation is not caused by an illegal signal transmitted to the ECU 10 intentionally or unintentionally.

Thus, in a development stage of the ECU 10, a security test is performed on software stored in the ROM or the like of the ECU 10, and an illegal signal which may cause abnormality in a calculation process in the ECU 10 is specified, and thus the software is corrected. A general security test on software is performed in a black box state by using a security test device (security test tool) not having information regarding an internal structure of the software. Generally, the security test device transmits random test signals including an illegal signal, and also receives a certain response to the test signal from a test target device so as to specify the illegal signal. As such a security test, for example, there is fuzzing.

Thus, in an ECU 10 which does not have a configuration in which a signal is received from another ECU, and a result of performing a calculation process is returned to another ECU, a security test using a general security test device cannot be performed.

On the other hand, in the development stage of the ECU 10, as a device testing an operation of the ECU 10, a function evaluation device (test evaluation tool) is used which monitors an output signal from a test target ECU 10 to another ECU or a peripheral device, or an input signal to the test target ECU 10 from the peripheral device, and performs evaluation. The function evaluation device evaluates an output signal from the ECU 10 or an input signal to the ECU 10 when a specific command or condition is input to the ECU 10. Therefore, security tests using all possible input signals cannot be performed.

In contrast, in the security test system according to the present embodiment, a function evaluation device monitors whether or not abnormality is observed in an output signal which is output from the ECU 10 or an input signal which is input to the ECU 10 from a peripheral device as a result of the ECU 10 performing a calculation process on the basis of random test signals output from a security test device. In a case where abnormality is observed in the output signal from the ECU 10 or the input signal to the ECU 10, the security test device specifies an illegal signal causing the abnormality on the basis of information regarding the abnormality. Consequently, a security test can be performed by using the security test device without considerably changing the ECU 10.

FIG. 2 is a block diagram illustrating the entire configuration of the security test system according to the present embodiment. The security test system includes a security test unit 100 and a function evaluation unit (function evaluation device) 150. As described above, in the security test system according to the present embodiment, the security test unit 100 and the function evaluation unit 150 are configured as independent devices. However, the security test unit 100 and the function evaluation unit 150 may be configured as a single device. Hereinafter, a description will be made of a configuration of each unit and a security test method performed by the security test system by exemplifying a case where the on-vehicle network 1 is a CAN system.

1-2-2. Security Test Unit

The security test unit 100 includes, for example, a processor such as a CPU, and is provided with a test signal transmission portion 110, a diagnosis portion 120, and a storage portion 130. The processor performs a program so as to function as the test signal transmission portion 110 and the diagnosis portion 120. The storage portion 130 includes a RAM and a ROM, and stores programs executed by the processor and various pieces of data. The storage portion 130 may include a semiconductor memory, a hard disk, an externally attached storage device, and the like.

The test signal transmission portion 110, which is formed of, for example, a processor and a drive circuit, receives random test signals including an illegal signal, and transmits the test signal to the test target ECU 10 via the communication bus 5. The test signal may be, for example, a fuzzing signal. In the security test system according to the present embodiment, the test signal transmission portion 110 randomly transmits a CAN message formed of a test signal to the ECU 10. For example, all CAN messages which can be formed may be randomly transmitted to the ECU 10. The CAN message may include an illegal signal.

In a case where there is abnormality in a process result as a result of the ECU 10 performing a calculation process on the basis of the test signal transmitted from the test signal transmission portion 110, the diagnosis portion 120 specifies an illegal signal causing the abnormality. For example, the diagnosis portion 120 may specify a transmission time of a test signal causing abnormality on the basis of information regarding the abnormality which is output from the function evaluation unit 150 and is stored in the storage portion 130, so as to specify an illegal signal. However, a method of specifying an illegal signal in the diagnosis portion 120 is not limited to the above-described example, and may employ various methods including well-known methods of the related art in a security test device.

The storage portion 130 stores abnormality information output from the function evaluation unit 150. The abnormality information is related to a calculation process result in a case where there is abnormality in the calculation process result in the ECU 10 due to an illegal signal of the test signal transmitted to the ECU 10 from the test signal transmission portion 110. Details thereof will be described later in description of an abnormality detection portion 170 of the function evaluation unit 150.

1-2-3. Function Evaluation Unit

The function evaluation unit 150 includes, for example, a processor such as a CPU, and is provided with a test condition setting portion 155, a process information acquisition portion 160, an abnormality detection portion 170, and an abnormality information output portion 180. The processor performs a program so as to function as the test condition setting portion 155, the process information acquisition portion 160, the abnormality detection portion 170, and the abnormality information output portion 180. The function evaluation unit 150 includes a storage portion (not illustrated). The storage portion includes a RAM and a ROM, and stores programs executed by the processor and various pieces of data. The storage portion may include a semiconductor memory, a hard disk, an externally attached storage device, and the like.

The test condition setting portion 155 transmits a signal for test conditions to the test target ECU 10 so that the ECU 10 is placed in a normal test environment. For example, vehicle states which will occur when the ECU 10 is actually mounted on the vehicle is set as the test conditions which are then transmitted to the ECU 10. For example, the signals for the test conditions which may be transmitted may include a signal indicating ON and Off states of an ignition switch, analog signals or digital signals including various pieces of information which may be input to the ECU 10 from peripheral devices or the like, and at least one of CAN messages including information regarding a vehicle speed or a gear position. The test conditions may be manually set by a user, or may be automatically set, or may be manually or automatically selected from a single or a plurality of test conditions which are set in advance. In a case where a security test is performed under a plurality of test conditions, the test condition setting portion 155 may perform a security test under various test conditions while switching between the test conditions.

The process information acquisition portion 160 acquires information regarding a result of a process performed by the ECU 10 on the basis of the test signal transmitted from the security test unit 100. The process result information may include an output signal output from the ECU 10 as the result of the process, an input signal which is input to the ECU 10 from a peripheral device, data stored in the storage portion such as a RAM or a ROM provided in the ECU 10, and the like. More specifically, the process result information may include a CAN message transmitted to the communication bus 5 from the ECU 10, an analog signal or a digital signal transmitted to the ECU 10 from a peripheral device, an analog signal or a digital signal which is input to the ECU 10 from a peripheral device, data regarding a memory address stored in the storage portion of the ECU 10, and the like. The process information acquisition portion 160 may store the acquired information in a storage portion (not illustrated).

The abnormality detection portion 170 detects abnormality in the process result on the basis of the process result information acquired by the process information acquisition portion 160. Abnormality which may occur as a result of the ECU 10 performing a calculation process by using random test signals may appear in various aspects. For example, the abnormality in the process result in the ECU 10 may be determined on the basis of whether or not the ECU 10 appropriately transmits a CAN message, whether or not a sensor value which is input to the ECU 10 is in an appropriate range, whether or not a change in a sensor value is appropriate, or whether or not a frequency of a sensor value is appropriate. The presence or absence of such abnormality may be determined by determining whether or not a process result which is output under test conditions set by the test condition setting portion 155 is appropriate.

FIG. 3 illustrates a determination table exemplifying several abnormality determination methods performed by the abnormality detection portion 170. For example, in a case where a transmission frequency fe of a CAN message transmitted to the communication bus 5 as an output signal from the ECU 10 exceeds an upper limit frequency fe_0 expected under set test conditions, the abnormality detection portion 170 may determine that a process result in the ECU 10 is abnormal. For example, in a case where a CAN message is transmitted at a higher frequency despite the CAN message being set to be transmitted at 100 milliseconds, the abnormality detection portion 170 may determine that a process result in the ECU 10 is abnormal.

In a case where a voltage value V of an analog or digital command signal transmitted to a peripheral device as an output signal from the ECU 10 exceeds an upper limit value V_0 expected under set test conditions, the abnormality detection portion 170 may determine that a process result in the ECU 10 is abnormal. For example, in a case where the voltage value V of the command signal considerably exceeds 2.0 V (=V_0), the abnormality detection portion 170 may determine that a process result in the ECU 10 is abnormal. Not only an upper limit value of the voltage value V but also a lower limit value may be set.

In a case where a transmission frequency fv of an analog or digital command signal transmitted to a peripheral device from the ECU 10 exceeds an upper limit frequency fv_0 expected under set test conditions, the abnormality detection portion 170 may also determine that a process result in the ECU 10 is abnormal. In the ECU 10, a cycle of a calculation process or a transmission cycle of a command signal is set depending on a control target, and thus the transmission frequency fv of the command signal may be used to detect abnormality. For example, in a case where the transmission frequency fv of an analog or digital command signal considerably exceeds 10,000 Hz (=fv_0), the abnormality detection portion 170 may determine that a process result in the ECU 10 is abnormal.

In a case where a voltage value V of an analog signal or a digital signal which is input to the ECU 10 from a peripheral device after reflecting a result of the calculation process in the ECU 10 exceeds the upper limit value V_0 expected under set test conditions, the abnormality detection portion 170 may determine that a process result in the ECU 10 is abnormal. For example, in a case where the voltage value V of a sensor signal considerably exceeds 2.0 V (=V_0), the abnormality detection portion 170 may determine that a process result in the ECU 10 is abnormal. Not only an upper limit value of the voltage value V but also a lower limit value may be set.

In a case where a transmission frequency fv of an analog or digital signal input to the ECU 10 from a peripheral device exceeds the upper limit frequency fv_0 expected under set test conditions, the abnormality detection portion 170 may also determine that a process result in the ECU 10 is abnormal. For example, in the ECU 10, a cycle of transmitting a sensor signal from various sensors to the ECU 10 is set, and thus the transmission frequency fv of the sensor signal may be used to detect abnormality.

In a case where a change amount ΔX of a value per unit time which may be included in information included in a CAN message transmitted to the communication bus 5 from the ECU 10, an output signal to a peripheral device from the ECU 10, or an input signal to the ECU 10 from the peripheral device exceeds a threshold value ΔX_0 expected under set test conditions, the abnormality detection portion 170 may determine that a process result in the ECU 10 is abnormal. For example, in a case where an engine speed as information included in an output signal from the ECU 10 or an input signal to the ECU 10 increases from 3,000 revolutions to 8,000 revolutions in a short period of time, the abnormality detection portion 170 may determine that a process result in the ECU 10 is abnormal.

In a case where an unchangeable memory address value Y included in predetermined memory addresses in the ECU 10 is overwritten after a calculation process result in the ECU 10 is reflected, the abnormality detection portion 170 may determine that a process result in the ECU 10 is abnormal. For example, in a case where the memory address value Y is overwritten despite the memory address value Y indicating an end of a buffer frame of a CAN message being set to an unchangeable value, the abnormality detection portion 170 may determine that a process result in the ECU 10 is abnormal.

For example, a threshold value or the like for determining abnormality is set for each test condition which can be set. Preferably, a determination table is prepared in advance for each test condition which can be set, and is stored in the storage portion. An abnormality determination method is not limited to the examples illustrated in FIG. 3. Some of the determination types exemplified in FIG. 3 may be omitted. Alternatively, the abnormality detection portion 170 may determine abnormality in a process result in the ECU 10 according to methods other than the examples described here. For example, in a case where the ECU 10 which functions as a gateway receives a CAN message, and does not transmit the received CAN message to other ECUs despite being set to transmit the CAN message to the other ECUs, the abnormality detection portion 170 may determine that a process result in the ECU 10 is abnormal.

The abnormality information output portion 180 outputs information regarding abnormality in a case where the abnormality detection portion 170 detects the abnormality in a calculation process result in the ECU 10, and stores the abnormality information in the storage portion 130 of the security test unit 100. When the abnormality information is stored in the storage portion 130 of the security test unit 100, for example, the abnormality information may be stored along with, for example, at least one piece of information regarding a time point at which the ECU 10 performs output or input, a time point at which the process information acquisition portion 160 of the function evaluation unit 150 acquires process result information, a time point at which the abnormality detection portion 170 detects abnormality, and a time point at which abnormality information is output from the abnormality information output portion 180.

The diagnosis portion 120 of the security test unit 100 may specify an illegal signal causing abnormality in a process result in the ECU 10 on the basis of, for example, time information correlated with abnormality information, and information regarding a transmission time point of each test signal which is randomly transmitted from the test signal transmission portion 110. However, a method of specifying an illegal signal in the diagnosis portion 120 of the security test unit 100 is not limited to such an example, and the diagnosis portion 120 may specify an illegal signal causing abnormality in a process result in the ECU 10 as follows.

For example, in a case where the test signal transmission portion 110 of the security test unit 100 transmits a plurality of test signals at a short interval, an illegal signal is temporarily specified on the basis of time information correlated with abnormality information and information regarding a transmission time point in the same manner as in the above-described example, and then the test signal transmission portion 110 retransmits a plurality of test signals which were transmitted before and after the specified illegal signal. At this time, the test signal transmission portion 110 retransmits the test signals at a transmission interval which is longer than a transmission interval when the test signals are initially transmitted. Consequently, it is possible to ensure a certainty of a specified illegal signal.

For example, in a case where the test signal transmission portion 110 transmits test signals TS1, TS2, TS3, TS4, TS5, TS6, TS7, TS8, TS9 and TS10 in the first round, and the test signal TS6 is specified as an illegal signal, the test signal transmission portion 110 transmits the test signals TS4, TS5, TS6, TS7 and TS8 at a longer transmission interval in the second round. The diagnosis portion 120 specifies an illegal signal again on the basis of abnormality information fed back through abnormality determination in the abnormality detection portion 170 of the function evaluation unit 150 in the same manner as in the first round. In this case, since a transmission interval of a test signal is long, and correlation with thus time information is facilitated, for example, it is possible to find that an actual illegal signal is not the test signal TS6 but the test signal TS5.

As another example, the process information acquisition portion 160 of the function evaluation unit 150 also acquires information regarding a test signal as a CAN message causing a calculation process to be performed when acquiring information regarding a result of the calculation process from the ECU 10. In this case, when abnormality in a process result is detected, the abnormality detection portion 170 of the function evaluation unit 150 can identify a test signal (illegal signal), and the abnormality information output portion 180 outputs abnormality information including information regarding the illegal signal to the storage portion 130 of the security test unit 100 and stores the information therein. As a result, the diagnosis portion 120 of the security test unit 100 can specify the illegal signal.

As still another example, the test signal transmission portion 110 of the security test unit 100 may transmit test signals at a transmission interval which is equal to or more than the maximum waiting time for which abnormality information can be fed back from the function evaluation unit 150. In this case, the diagnosis portion 120 can specify that the previously transmitted test signal is an illegal signal when information regarding abnormality in a process result in the ECU 10 is fed back from the function evaluation unit 150.

1-2-4. Flowchart

Next, with reference to FIG. 4, a description will be made of an example of a flowchart of a security test method performed by the security test system according to the present embodiment. A process in the following flowchart may be performed, for example, in a final stage of a development process of the ECU 10.

First, the test condition setting portion 155 of the function evaluation unit 150 sets test conditions, and transmits the test conditions to the test target ECU 10 (step S8). The test conditions include, for example, ON and OFF states of an ignition switch, differential states of peripheral devices or the like from which analog signals or digital signals may be input to the ECU 10, and vehicle states such as a vehicle speed or a gear position. These conditions may be manually set by a user, or may be automatically set, or may be manually or automatically selected from a single or a plurality of test conditions which are set in advance.

Next, the test signal transmission portion 110 of the security test unit 100 transmits random test signals including an illegal signal to the ECU 10 via the communication bus 5 (step S10). The random test signals may be generated by a predetermined random signal generation program. Next, the ECU 10 having received the test signals performs a calculation process on the basis of the test signals (step S14). As a result, a CAN message is output from the ECU 10 to the communication bus 5, a command signal is output to a peripheral device connected to the ECU 10, or a sensor signal or the like is input to the ECU 10 from the peripheral device.

Next, the process information acquisition portion 160 of the function evaluation unit 150 acquires, from the ECU 10, an output signal from the ECU 10 as a result of the process, an input signal which is input to the ECU 10 from the peripheral device, data stored in the storage portion such as a RAM or a ROM provided in the ECU 10, and the like, and the abnormality detection portion 170 performs abnormality determination (step S18). For example, the abnormality detection portion 170 refers to a corresponding abnormality determination criterion associated with the test condition exemplified in FIG. 3, and determines the presence or absence of abnormality in a process result in the ECU 10.

Next, the abnormality detection portion 170 of the function evaluation unit 150 determines whether or not there is abnormality in the process result in the ECU 10 (step S22), and proceeds to step S34 in a case where there is no abnormality (step S22: No). On the other hand, in a case where there is abnormality (step S22: Yes), the abnormality information output portion 180 of the function evaluation unit 150 outputs information regarding the abnormality to the security test unit 100 (step S26). Consequently, the information regarding the abnormality in the process result in the ECU 10 is stored in the storage portion 130 of the security test unit 100.

Next, the diagnosis portion 120 of the security test unit 100 specifies an illegal signal causing the abnormality in the process result in the ECU 10 on the basis of the information regarding the abnormality stored in the storage portion 130 and information regarding the test signals transmitted from the test signal transmission portion 110 (step S30). For example, the diagnosis portion 120 may specify the illegal signal by specifying a transmission time of a test signal causing the abnormality on the basis of the information regarding the abnormality which is output from the function evaluation unit 150 and is stored in the storage portion 130. A method of specifying an illegal signal is not limited to the above-described example. Information regarding the specified illegal signal may be stored in the storage portion 130 so as to be referred to in the future.

In a case where abnormality is not observed in step S22 (step S22: No), or the illegal signal is specified in step S30, the test signal transmission portion 110 of the security test unit 100 determines whether or not a test is continuously performed (step S34). In a case where a test signal used for a test remains (step S34: Yes), the flow returns to step S8, and the processes described hitherto are repeatedly performed. On the other hand, in a case where transmission of all test signals is completed (step S34: No), the security test in the security test system is finished.

Thereafter, a programmer of the software of the ECU 10 corrects the software by referring to the information regarding the illegal signal stored in the storage portion 130 of the security test unit 100, so as to improve the vulnerability of the software. Such a security test is repeatedly performed until process results in the ECU 10 become normal with respect to all test signals. Consequently, security of the ECU 10 is ensured.

1-3. Modification Examples

The security test system according to the embodiment described hitherto is not limited to the above-described description, and may be variously modified. Hereinafter, several modification examples of the security test system according to the present embodiment will be described.

1-3-1. First Modification Example

FIG. 5 illustrates a configuration example of a security test system according to a first modification example of the present embodiment. The security test system according to the first modification example includes a display device 80 which controls display on the basis of a process result in the ECU 10, and an imaging unit 90 which captures an image of a display state of the display device 80.

The display device 80 may be, for example, an instrument cluster, and a pseudo-control state of a vehicle based on a control command from the ECU 10 is displayed on the instrument cluster.

The imaging unit 90 includes three cameras 91, 92 and 93 which have an imaging region including a display portion of the display device 80. The respective cameras 91, 92 and 93 divide and capture images of the display portion of the display device 80. The number of cameras is not limited to three. The cameras may be, for example, cameras which include a charge-coupled device (CCD) image sensor or a complementary metal oxide semiconductor (CMOS) image sensor and can capture color images. Image information obtained by the imaging unit 90 is transmitted to the abnormality detection portion 170 of the function evaluation unit 150.

The abnormality detection portion 170 performs, for example, image processing such as image recognition or character recognition, and also determines abnormality in a calculation process result in the ECU 10 on the basis of a result of the image processing. For example, the abnormality detection portion 170 can calculate the display content by recognizing a numerical value on the display device 80, recognizing an angle of a gauge, or recognizing whether or not a lamp is lighted, through the image processing.

FIG. 6 illustrates a determination table exemplifying several abnormality determination methods performed by the abnormality detection portion 170 of the function evaluation unit 150 of the security test system according to the first modification example. Among the determination types illustrated in FIG. 6, the determination types of 1 to 3 and 5 are the same as those in the determination table illustrated in FIG. 3.

In the determination type of 4, in a case where a change amount $\Delta X$ of a predetermined value per unit time exceeds an expected threshold value $\Delta X\_0$ by using not only a value which may be included in information included in a CAN message transmitted to the communication bus 5 from the ECU 10, an output signal to a peripheral device from the ECU 10, or an input signal to the ECU 10 from the peripheral device but also imaging information from the display device 80, the abnormality detection portion 170 may determine that a process result in the ECU 10 is abnormal. For example, in a case where an engine speed displayed on an engine speed meter of the display portion of the display device 80 increases from 3,000 revolutions to 8,000 revolutions in a short period of time, the abnormality detection portion 170 may determine that a process result in the ECU 10 is abnormal.

In the determination type of 6, in a case where there is contradiction in the display content of the display device 80, the abnormality detection portion 170 may determine that a process result in the ECU 10 is abnormal. For example, in a case where "D (driving)" and "P (parking)" displayed at a gear range position on the display device 80 are lighted together as a result of a calculation process in the ECU 10 based on test signals, the abnormality detection portion 170 may determine that the process result in the ECU 10 is abnormal.

A security test method performed by the security test system according to the first modification example may be performed according to the example of the flowchart illustrated in FIG. 4. The security test system according to the first modification example can also visually monitor an operation of the ECU 10 by using imaging information from the display device 80 which displays a control state of a vehicle based on a control command from the ECU 10.

1-3-2. Second Modification Example

FIG. 7 illustrates a configuration example of a security test system according to a second modification example of the first embodiment. In the security test system according to the second modification example, an abnormality information output portion 185 of the function evaluation unit 150 transmits abnormality information not to the security test unit 100 but to a storage portion 190 provided in the function evaluation unit 150, and the abnormality information is stored in the storage portion. The storage portion 190 includes a semiconductor memory, a hard disk, an externally attached storage device, and the like, and the security test unit 100 can read the stored abnormality information in the future.

For example, the security test unit 100 may read the abnormality information by connecting the security test unit 100 and the function evaluation unit 150 to each other via a communication line, or connecting a hard disk or a universal serial bus (USB) memory storing the abnormality information to the security test unit 100. Consequently, the diagnosis portion 120 of the security test unit 100 may specify an illegal signal on the basis of information regarding abnormality information in a process result in the ECU 10 and information regarding test signals which are randomly transmitted.

FIG. 8 is a flowchart related to a security test method performed by the security test system according to the second modification example. The security test unit 100, the ECU 10, and the function evaluation unit 150 perform processes in steps S8 to S22 in the same procedures as the procedures described with reference to the flowchart in FIG. 4. In the security test system according to the second modification example, in a case where there is abnormality in a process result in the ECU 10 (step S22: Yes), in step S27, the abnormality information output portion 185 of the function evaluation unit 150 stores information regarding the abnormality in the process result in the ECU 10 in the storage portion 190.

In a case where abnormality is not observed in step S22 (step S22: No), or the abnormality information is stored in the storage portion 190 in step S27, the test signal transmission portion 110 of the security test unit 100 determines whether or not a test is continuously performed (step S34). Until a test signal used for a test does not remain (step S34:

No), the flow returns to step S8, and the processes described hitherto are repeatedly performed.

The security test system according to the second modification example can temporarily store information regarding abnormality detected by the abnormality detection portion 170 of the function evaluation unit 150 in the storage portion 190, and then can collectively specify an illegal signal. According to the security test system according to the second modification example, for example, it is possible to reduce a load on the security test unit 100 during transmission of random test signals, such as fuzzing.

1-3-3. Third Modification Example

FIG. 9 illustrates a modification example (third modification example) of the flowchart related to the security test method performed by the security test system according to the present embodiment, illustrated in FIG. 2. In the third modification example, a plurality of test conditions are sequentially set by the test condition setting portion 155 of the function evaluation unit 150, and a security test is performed under each of the test conditions.

The test condition setting portion 155 of the function evaluation unit 150 may select a test condition for performing a security test from among a plurality of test conditions stored in a storage portion (not illustrated) in advance, and transmit a signal for the test condition to the test target ECU 10. If a security test under a certain test condition is completed, the test condition setting portion 155 sequentially switches between the subsequent test conditions, and thus security tests are performed under a plurality of test conditions.

The plurality of test conditions may be set as follows, for example. Test condition 1: Ignition switch=OFF, gear range=parking range, vehicle speed=0 km/h, and the like Test condition 2: Ignition switch=ON, gear range=driving range, vehicle speed=50 km/h, and the like Test condition 3: Ignition switch=ON, gear range=reverse range, vehicle speed=5 km/h, and the like The number of test conditions is not limited to three. In addition to the exemplified test conditions, information regarding vehicle states which can be expected may be included in test conditions. In the following description of the flowchart, a description will be made of an example of performing a security test while setting the above-described test conditions 1 to 3 in this order. However, the order of setting test conditions may be random.

With reference to the flowchart illustrated in FIG. 9, first, the test condition setting portion 155 of the function evaluation unit 150 selects one test condition from among a plurality of test conditions which are set in advance (step S6). For example, the test condition setting portion 155 selects the test condition 1 right after the security test is started.

Thereafter, under the selected test condition, the security test unit 100, the ECU 10, and the function evaluation unit 150 perform processes in steps S8 to S30 in the same procedures as the procedures described with reference to the flowchart in FIG. 4. After determining which test signal is an illegal signal as a result of the processes, the test condition setting portion 155 determines whether or not a test is continuously performed under the present test condition (step S36). For example, the test condition setting portion 155 may perform the determination in step S36 by determining whether or not tests using all test signals are completed under the present test condition.

In a case where the test is continuously performed under the present test condition (step S36: Yes), the flow returns to step S8, and the processes in steps S8 to S30 are repeatedly performed. On the other hand, in a case where the test is completed under the present test condition (step S36: No), the test condition setting portion 155 determines whether or not a test is continuously performed under different test conditions (step S38). In a case where test conditions under which a test is not completed remain, and thus the test is continuously performed under different test conditions (step S38: Yes), the test condition setting portion 155 returns to step S6, and selects the next test condition. For example, the test condition setting portion 155 selects the test condition 2 after a test under the test condition 1 is completed, and selects the test condition 3 after a test under the test condition 2 is completed.

As mentioned above, while the plurality of test conditions are sequentially selected, the security test unit 100, the ECU 10, and the function evaluation unit 150 perform the processes in steps S8 to S30 under the selected test conditions. In a case where the tests under all of the test conditions are completed, the test condition setting portion 155 determines that a test under a differing test condition is not continued (step S38: No), and thus the security test performed by the security test system is finished.

According to the security test system according to the third modification example, a security test under a plurality of test conditions set according to various vehicle states which can be expected in advance can be automatically performed, and an illegal signal which may be present under each test condition can be specified.

The flowchart illustrated in FIG. 9 is an example in which the third modification example is applied to the flowchart related to the process illustrated in FIG. 4, but the third modification example may be applied to the flowchart related to the process in the second modification example illustrated in FIG. 8. In a case where the third modification example is applied to the second modification example, step S6 is provided as a preprocess of step S8 in the flowchart illustrated in FIG. 8, and steps S36 and S38 are also provided instead of step S34.

As described above, the security test system according to the first embodiment includes the security test unit 100 which transmits random test signals to the ECU 10 via the communication bus 5, and the function evaluation unit 150 which acquires information regarding a calculation process result in the ECU 10 based on the test signals, performs abnormality determination, and feeds back information regarding detected abnormality to the security test unit 100, or stores the information in the storage portion 190. Therefore, it is possible to perform a security test using the security test unit 100 on even the ECU 10 not having a configuration of returning any response such as a process result to a received CAN message.

2. Second Embodiment

Next, a security test system according to a second embodiment will be described. FIG. 10 is a block diagram illustrating the entire configuration of the security test system according to the present embodiment. The security test system includes a security test unit 300 and a function evaluation unit 350. Hereinafter, a configuration of each unit, and a security test method performed by the security test system will be described focusing on differences from the first embodiment.

The security test unit 300 includes, for example, a processor such as a CPU, and is provided with a test signal transmission portion 310, a diagnosis portion 320, and a storage portion 330. Among the constituent elements, the diagnosis portion 320 and the storage portion 330 may have the same configurations as those of the diagnosis portion 120 and the storage portion 130 of the security test unit 100 illustrated in FIG. 2. In the security test system according to the present embodiment, the test signal transmission portion 310 transmits random test signals including an illegal signal not only to the test target ECU 10 but also to the function evaluation unit 350 via the communication bus 5.

The function evaluation unit 350 includes, for example, a processor such as a CPU, and is provided with a test condition setting portion 355, a process information acquisition portion 360, an abnormality detection portion 370, and an abnormality information output portion 380. Among the constituent elements, the test condition setting portion 355, the process information acquisition portion 360, and the abnormality information output portion 380 may have the same configurations as those of the test condition setting portion 155, the process information acquisition portion 160, and the abnormality information output portion 180 of the function evaluation unit 150 illustrated in FIG. 2.

In the security test system according to the present embodiment, the abnormality detection portion 370 of the function evaluation unit 350 acquires information regarding test signals transmitted from the test signal transmission portion 310 of the security test unit 300. The abnormality detection portion 370 extracts illegal signal candidates which are not appropriate as CAN messages transmitted to the ECU 10, from the test signals. The abnormality detection portion 370 performs abnormality determination on only pieces of information regarding process results based on the extracted illegal signal candidates among pieces of information regarding process results in the ECU 10, acquired by the process information acquisition portion 360. The abnormality determination process may be performed in the same manner as in the abnormality determination method exemplified in FIG. 3.

The extraction of illegal signal candidates may be performed, for example, by setting test signals including information which is not expected for the test target ECU 10, and setting a test signal in advance in a case where an expected illegal signal is recognized, as the illegal signal candidates. Alternatively, the extraction of illegal signal candidates may be performed by excluding a test signal using which a test has already been determined as being normal under the same test condition. In addition, the abnormality detection portion 370 may extract illegal signal candidates according to various methods, for example, by selecting, as an illegal signal candidate, a test signal which is not considered as being appropriate in terms of a structure of a CAN message.

The abnormality information output portion 380 outputs information regarding a process result in the ECU 10 in which abnormality is actually observed as a result of the abnormality determination process, to the security test unit 300, and stores the information in the storage portion 330 of the security test unit 300. The diagnosis portion 320 of the security test unit 300 specifies an illegal signal on the basis of the information regarding abnormality information in a process result in the ECU 10, stored in the storage portion 330, and information regarding test signals which are randomly transmitted.

FIG. 11 illustrates an example of a flowchart related to a security test method performed by the security test system according to the present embodiment. The flowchart illustrated in FIG. 11 includes the same steps S8, S14, S18, S22, S26, S30 and S34 as those in the flowchart illustrated in FIG. 4 except for steps S11 and S17.

First, the test condition setting portion 355 of the function evaluation unit 350 sets test conditions, and transmits the test conditions to the test target ECU 10 (step S8). Next, the test signal transmission portion 310 of the security test unit 300 transmits random test signals including an illegal signal not only to the ECU 10 but also to the function evaluation unit 350, via the communication bus 5 (step S11). Next, the ECU 10 having received the test signals performs a calculation process on the basis of the test signals (step S14). Next, the abnormality detection portion 370 of the function evaluation unit 350 extracts illegal signal candidates which are not appropriate as CAN messages from the test signals (step S17).

Next, the process information acquisition portion 360 of the function evaluation unit 350 acquires information pieces of information regarding process results from the ECU 10, and the abnormality detection portion 370 performs abnormality determination on pieces of information regarding process results based on the illegal signal candidates extracted in step S17 (step S18). The abnormality detection portion 370 may determine whether or not there is abnormality in a process result in the ECU 10 by referring to the criterion of abnormality determination exemplified in FIG. 3.

On the other hand, in a case where there is abnormality in the process result in the ECU 10 (step S22: Yes), the abnormality information output portion 380 of the function evaluation unit 350 transmits information regarding the abnormality to the security test unit 300 (step S26), and the diagnosis portion 320 of the security test unit 300 specifies an illegal signal (step S30). The respective processes in steps S22 to S34 may be performed in the same manner as the respective processes described on the basis of the flowchart illustrated in FIG. 4.

As described above, according to the security test system according to the second embodiment, the function evaluation unit 350 performs abnormality determination on only pieces of information process results in the ECU 10 corresponding to illegal signal candidates extracted in advance, and feeds back information regarding detected abnormality to the security test unit 300. Therefore, it is possible to reduce a load on the function evaluation unit 350 compared with the security test system according to the first embodiment.

Also in the security test system according to the present embodiment, a security test may be performed through an appropriate combination between the first to third modification examples of the first embodiment.

3. Third Embodiment

Next, a security test system according to a third embodiment will be described. FIG. 12 is a block diagram illustrating the entire configuration of the security test system according to the present embodiment. The security test system includes a security test unit 400 and a function evaluation unit 450. Hereinafter, a configuration of each unit, and a security test method performed by the security test system will be described focusing on differences from the first and second embodiments.

The security test unit 400 includes, for example, a processor such as a CPU, and is provided with a test signal transmission portion 410, a diagnosis portion 420, and a storage portion 430. Among the constituent elements, the diagnosis portion 420 and the storage portion 430 may have the same configurations as those of the diagnosis portion 120 and the storage portion 130 of the security test unit 100 illustrated in FIG. 2. In the security test system according to the present embodiment, the test signal transmission portion 410 transmits random test signals including an illegal signal to the function evaluation unit 450.

The function evaluation unit 450 includes, for example, a processor such as a CPU, and is provided with a test condition setting portion 455, an illegal signal candidate extraction portion 460, a process information acquisition portion 470, an abnormality detection portion 480, and an abnormality information output portion 490. Among the constituent elements, the test condition setting portion 455, the process information acquisition portion 470, the abnormality detection portion 480, and the abnormality information output portion 490 may have the same configurations as those of the test condition setting portion 155, the process information acquisition portion 160, the abnormality detection portion 170, and the abnormality information output portion 180 of the function evaluation unit 150 illustrated in FIG. 2.

In the security test system according to the present embodiment, the illegal signal candidate extraction portion 460 of the function evaluation unit 450 extracts illegal signal candidates which are not appropriate as CAN messages transmitted to the ECU 10, from the test signals which are randomly transmitted from the test signal transmission portion 410 of the security test unit 400. The illegal signal candidate extraction portion 460 transmits test signals corresponding to the extracted illegal signal candidates to the ECU 10 via the communication bus 5. Consequently, the ECU 10 performs a calculation process on the basis of only the test signals corresponding to the illegal signals. As a result, an amount of pieces of information regarding process results in the ECU 10, acquired by the process information acquisition portion 470 is reduced, and thus a load on the abnormality detection portion 480 performing a determination process is reduced.

The extraction of illegal signal candidates may be performed, for example, by setting test signals including information which is not expected for the test target ECU 10, and setting a test signal in advance in a case where an expected illegal signal is recognized, as the illegal signal candidates. Alternatively, the extraction of illegal signal candidates may be performed by excluding a test signal using which a test has already been determined as being normal under the same test condition. In addition, the illegal signal candidate extraction portion 460 may extract illegal signal candidates according to various methods, for example, by selecting, as an illegal signal candidate, a test signal which is not considered as being appropriate in terms of a structure of a CAN message.

FIG. 13 illustrates an example of a flowchart related to a security test method performed by the security test system according to the present embodiment. The flowchart illustrated in FIG. 13 includes the same steps S8, S14, S18, S22, S26, S30 and S34 as those in the flowchart illustrated in FIG. 4 except for steps S12 and S13.

In the present embodiment, first, the test condition setting portion 455 of the function evaluation unit 450 sets test conditions, and transmits the test conditions to the test target ECU 10 (step S8). Next, the test signal transmission portion 410 of the security test unit 400 transmits random test signals including an illegal signal to the function evaluation unit 450 (step S12). The illegal signal candidate extraction portion 460 of the function evaluation unit 450 having received the test signals extracts illegal signal candidates which are not appropriate as CAN messages transmitted to the ECU 10, from the test signals, and transmits the extracted test signals to the ECU 10 (step S13).

Thereafter, the ECU 10 performs a calculation process on the basis of the received test signals (step S14), and the process information acquisition portion 470 of the function evaluation unit 450 acquires information regarding a process result from the ECU 10, and the abnormality detection portion 480 performs abnormality determination on the information regarding the process result (step S18). In a case where there is abnormality in the process result in the ECU 10 (step S22: Yes), the abnormality information output portion 490 of the function evaluation unit 450 outputs information regarding the abnormality to the security test unit 400 (step S26), and the diagnosis portion 420 of the security test unit 400 specifies an illegal signal (step S30). The respective processes in steps S14 to S34 may be performed in the same manner as the respective processes described on the basis of the flowchart illustrated in FIG. 4.

As described above, in the security test system according to the third embodiment, the function evaluation unit 450 extracts illegal signal candidates from randomly transmitted test signals in advance, and transmits the illegal signal candidates to the ECU 10. The function evaluation unit 450 performs abnormality determination on only pieces of information regarding calculation process results in the ECU 10 based on the illegal signal candidates, and feeds back information regarding detected abnormality to the security test unit 400. Therefore, it is possible to reduce a load on the function evaluation unit 450 compared with the security test system according to the first embodiment.

Also in the security test system according to the present embodiment, a security test may be performed through an appropriate combination between the first to third modification examples of the first embodiment. For example, FIG. 14 illustrates a configuration example in which the second modification example of the first embodiment is combined with the security test system according to the present embodiment. In the security test system according to the modification example, an abnormality information output portion 495 of the function evaluation unit 450 transmits abnormality information not to the security test unit 400 but to a storage portion 498 provided in the function evaluation unit 450, and the abnormality information is stored in the storage portion. The storage portion 498 includes a semiconductor memory, a hard disk, an externally attached storage device, and the like, and the security test unit 400 can read the stored abnormality information in the future.

For example, the security test unit 400 may read the abnormality information by connecting the security test unit 400 and the function evaluation unit 450 to each other via a communication line, or connecting a hard disk or a universal serial bus (USB) memory storing the abnormality information to the security test unit 400. Consequently, the diagnosis portion 420 of the security test unit 400 may specify an illegal signal on the basis of information regarding abnormality information in a process result in the ECU 10 and information regarding test signals which are randomly transmitted.

FIG. 15 illustrates a flowchart related to a security test method performed by the security test system according to the modification example. The security test unit 400, the ECU 10, and the function evaluation unit 450 perform processes in steps S8 to S22 in the same procedures as the procedures described with reference to the flowchart in FIG. 13. In the security test system according to the modification example, in a case where there is abnormality in a process result in the ECU 10 (step S22: Yes), in step S27, the abnormality information output portion 495 of the function evaluation unit 450 stores information regarding the abnormality in the process result in the ECU 10 in the storage portion 498.

In a case where abnormality is not observed in step S22 (step S22: No), or until the abnormality information is stored in the storage portion 498 in step S27, and then a test signal used for a test does not remain (step S34: No), the flow returns to step S8, and the processes described hitherto are repeatedly performed.

The security test system according to the modification example of the present embodiment can temporarily store information regarding abnormality detected by the abnormality detection portion 480 of the function evaluation unit 450 in the storage portion 498, and then can collectively specify an illegal signal. According to the security test system according to the modification example, for example, it is possible to reduce a load on the security test unit 400 during transmission of random test signals, such as fuzzing.

4. Fourth Embodiment

Next, a security test system according to a fourth embodiment will be described. The security test system according to the present embodiment is configured to efficiently specify an illegal signal which may illegally operate the ECU 10 among a large number of input signals. FIG. 16 is a block diagram illustrating the entire configuration of the security test system according to the present embodiment. The security test system includes a security test unit 500 and a function evaluation unit 550. Hereinafter, a configuration of each unit, and a security test method performed by the security test system will be described focusing on differences from the first embodiment.

The security test unit 500 includes, for example, a processor such as a CPU, and is provided with a test signal transmission portion 510, a diagnosis portion 520, a storage portion 530, and a test signal adapting portion 540. Among the constituent elements, the test signal transmission portion 510, the diagnosis portion 520 and the storage portion 530 may have the same configurations as those of the test signal transmission portion 110, the diagnosis portion 120 and the storage portion 130 of the security test unit 100 illustrated in FIG. 2. The test signal adapting portion 540 adapts test signals transmitted from the test signal transmission portion 510 to the ECU 10 on the basis of test results performed until right before. Consequently, the security test unit 500 can generate test signals so that a security test can efficiently proceed in an accurate direction.

For example, in a CAN system as an on-vehicle network, a CAN message with a standard format includes an identifier (ID) having an 11-bit length in a data frame. A CAN message with an extended format includes an extended identifier having an 18-bit length in addition to the 11-bit length in the standard format. In a case of a CAN message with the standard format, 2,048 types of CAN messages can be identified, and, in a case of a CAN message with the extended format, about 5,400,000 types of CAN messages can be identified. If all CAN messages having different items of data content are transmitted, and security tests are to be performed, with respect to the CAN messages having individual identifiers, a large number of steps are necessary.

Therefore, in the security test system according to the present embodiment, in a case where a security test is performed under a certain test condition, the test signal transmission portion 510 first randomly transmits a plurality of CAN messages having different identifiers to the ECU 10 as test signals. In a case where there is abnormality in a process result in the ECU 10 based on any one of the transmitted test signals, the diagnosis portion 520 of the security test unit 500 specifies an illegal signal. In other words, a CAN message having a predetermined identifier is specified as an illegal signal.

Then, the test signal adapting portion 540 performs adaptation for the subsequent tests so that CAN messages having the same identifier as the identifier of the CAN message identified as an illegal signal and having different items of data content are transmitted as test signals. Consequently, the test signal transmission portion 510 randomly transmits a plurality of CAN messages having the identifier and different items of data content to the ECU 10. Thus, in the subsequent tests, a security test specialized to the CAN messages having the specific identifier is performed. As a result, it is possible to efficiently perform a test based on the CAN messages which have the same identifier as the identifier of the CAN message specified as an illegal signal and have different items of data content. In other words, since CAN messages having a high probability of including an illegal signal are preferentially used for tests compared with a case where a large number of CAN messages having different identifiers and items of data content are randomly transmitted, and an illegal signal is also specified, a security test is efficiently specified.

A method of adapting (narrowing) test signals in the test signal adapting portion 540 is not limited to the above-described example of specifying an identifier. The test signal adapting portion 540 may adapt test signals on the basis of test results performed until right before according to other appropriate conditions.

FIG. 17 illustrates an example of a flowchart related to a security test method performed by the security test system according to the present embodiment. The flowchart illustrated in FIG. 17 includes the same steps S8, S10, S14, S18, S22, S26, S30 and S34 as those in the flowchart illustrated in FIG. 4 except for step S7.

First, the test signal adapting portion 540 of the security test unit 500 adapts a CAN message (test signal) to be transmitted from the test signal transmission portion 510 to the ECU 10 (step S7). For example, the test signal adapting portion 540 sets CAN messages so that the CAN messages having a plurality of different identifiers are randomly transmitted as test signals right after a security test is started. Thereafter, the security test unit 500, the ECU 10, and the function evaluation unit 550 perform processes in steps S8 to S30 in the same procedures as the procedures described with reference to the flowchart in FIG. 4. In step S10, the test signal transmission portion 510 of the security test unit 500 randomly transmits the plurality of test signals set by the test signal adapting portion 540, to the ECU 10.

As a result of each of the processes in steps S8 to S30, a predetermined CAN message is determined as being an illegal signal, and then the test signal adapting portion 540 determines whether or not the test is continuously performed (step S34). In a case where transmission of all test signals is completed (step S34: No), the security test in the security test system is finished. On the other hand, in a case where a test signal used for a test remains (step S34: Yes), the test signal adapting portion 540 determines whether or not a CAN message as a test signal is required to be re-adapted (step S39). For example, in a case where there is no abnormality in a process result in the ECU 10 based on a test signal transmitted right before (in a case where No is determined in step S22), it is determined that re-adaptation of a test signal is not necessary (step S39: No) if transmission of all test signals under the present adaptation (narrowing) condition is not completed. In this case, the flow returns to step S8, and the processes described hitherto are repeatedly performed.

On the other hand, in a case where there is abnormality in a process result in the ECU 10 based on the test signal transmitted right before, and thus an illegal signal is specified (in a case where Yes is determined in step S22), it is determined that re-adaptation of a test signal is necessary (step S39: Yes) if test signals can be further narrowed. In this case, the flow returns to step S7, and the processes described hitherto are repeatedly performed. For example, in step S7, the test signal adapting portion 540 sets a plurality of CAN messages so that the CAN messages having the same identifier as the identifier of the CAN message identified as an illegal signal and having different items of data content are randomly transmitted as test signals. Consequently, CAN messages having a high probability of including an illegal signal are preferentially used for tests.

Alternatively, in step S39, in a case where transmission of all CAN messages under the present adaptation (narrowing) condition is completed, and further adaptation (narrowing) is possible, it is determined that re-adaptation of a test signal is necessary (step S39: Yes). In this case, the flow returns to step S7, test signals are set under another adaptation (narrowing) condition, and then the processes described hitherto are repeatedly performed.

As described above, in the security test system according to the fourth embodiment, CAN messages having a high probability of including an illegal signal are preferentially selected as test signals to be transmitted to the test target ECU 10 from the security test unit 500. Therefore, it is possible to efficiently perform a security test for specifying an illegal signal.

Also in the security test system according to the present embodiment, a security test may be performed through an appropriate combination between the first to third modification examples of the first embodiment, or through an appropriate combination with the second embodiment or the third embodiment.

5. Fifth Embodiment

Next, a security test system according to a fifth embodiment will be described. The security test system according to the present embodiment is configured as a system performing a security test on an ECU which controls a door lock system in cooperation with, for example, a smart phone or an electronic apparatus transmitting radio waves. FIG. 18 is a block diagram illustrating the entire configuration of the security test system according to the present embodiment. The security test system includes a security test unit 600 and a function evaluation unit 650. Hereinafter, a configuration of each unit, and a security test method performed by the security test system will be described focusing on differences from the first embodiment.

The security test unit 600 includes, for example, a processor such as a CPU, and is provided with a test signal transmission/reception portion 610, a diagnosis portion 620, and a storage portion 630. Among the constituent elements, the diagnosis portion 620 and the storage portion 630 may fundamentally have the same configurations as those of the diagnosis portion 120 and the storage portion 130 of the security test unit 100 illustrated in FIG. 2. In the security test system according to the present embodiment, the test signal transmission/reception portion 610 performs transmission and reception of signals with the ECU 10 through communication means 8 such as Wi-Fi, Bluetooth (registered trademark), or a USB, instead of an on-vehicle communication protocol such as a CAN.

For example, the test signal transmission/reception portion 610 transmits a door lock ON/OFF instruction signal to the test target ECU 10 as a test signal via the communication means 8. The test signal transmission/reception portion 610 receives a door lock drive signal as a result of a process in the ECU 10 based on the test signal, from the ECU 10 via the communication means 8. Information regarding the process result in the ECU 10 received by the test signal transmission/reception portion 610 may be referred to by the diagnosis portion 620.

The function evaluation unit 650 includes, for example, a processor such as a CPU and a storage portion, and is provided with a test condition setting portion 655, a process information acquisition portion 660, an abnormality detection portion 670, and an abnormality information output portion 680. The respective constituent elements may fundamentally have the same configurations as those of the test condition setting portion 155, the process information acquisition portion 160, the abnormality detection portion 170, and the abnormality information output portion 180 of the function evaluation unit 150 illustrated in FIG. 2.

The security test system according to the present embodiment having the configuration can test even the ECU 10 which can return a response result to a test signal to the security test unit 600, and can also test whether or not abnormal signals are exchanged among the ECU 10, peripheral devices, and other ECUs on the basis of the test signal. Therefore, the diagnosis portion 620 of the security test unit 600 can test not only whether or not a response to a test signal is appropriately made by the ECU 10, but also whether or not the ECU 10 performs an abnormal operation due to a test signal. Consequently, it is possible to more easily and accurately find the vulnerability of software of the ECU 10, and thus to improve the accuracy of a security test.

Also in the security test system according to the present embodiment, a security test may be performed through an appropriate combination between the first to third modification examples of the first embodiment, or through an appropriate combination with the second embodiment, the third embodiment, or the fourth embodiment.

As mentioned above, the preferred embodiments of the present invention have been described with reference to the accompanying drawings, but the present invention is not limited to the above-described embodiments. It is clear that a person skilled in the art can conceive of various modifications or alterations within the technical spirit disclosed in the claims, and it is understood that they are naturally included in the technical scope of the present invention.

For example, in the above-described respective embodiments, a description has been made of an example in which the security test unit and the function evaluation unit are configured as independent devices, but the present invention is not limited to this example. As exemplified in FIG. 19, the security test unit 100 and the function evaluation unit 150 may be stored in a single device 700, and different software programs may be executed. In this case, feedback of abnormality information from the function evaluation unit 150 to the security test unit 100 may be realized by using a feedback circuit in the device 700. In a case of this configuration, a part of the storage portion of each unit may be formed of a common memory or the like.

REFERENCE SIGNS LIST

1 ON-VEHICLE NETWORK
5 COMMUNICATION BUS
10 ECU
80 DISPLAY DEVICE
90 IMAGING UNIT
91, 92, 93 CAMERA
100 SECURITY TEST UNIT (SECURITY TEST DEVICE)
110 TEST SIGNAL TRANSMISSION PORTION
120 DIAGNOSIS PORTION
130 STORAGE PORTION
150 FUNCTION EVALUATION UNIT (FUNCTION EVALUATION DEVICE)
160 PROCESS INFORMATION ACQUISITION PORTION
170 ABNORMALITY DETECTION PORTION
180 ABNORMALITY INFORMATION OUTPUT PORTION

The invention claimed is:

1. A security test system for a control device for an on-vehicle network, the security test system comprising:
   a security test unit configured to electronically communicate with the control device over a first electrical bus, security test unit including
      a test signal transmission portion transmitting random test signals including an illegal signal, for diagnosing security of the control device for the on-vehicle network, and
      a diagnosis portion specifying the illegal signal on the basis of a process result in the control device using the random test signals; and
   a function evaluation unit configured to electronically communicate with the control device over a second electrical bus, the function evaluation unit including
      a process information acquisition portion acquiring information regarding the process result in the control device,
      an abnormality detection portion detecting abnormality in the process result in the control device based on the test signal, and
      an abnormality information output portion outputting information regarding the detected abnormality,
      wherein the first bus simulates a shared communication bus in the on-vehicle network, and the second bus provides the function evaluation unit with direct access to the process result apart from the simulated shared communication bus.

2. The security test system according to claim 1, wherein the security test unit further includes a test signal adapting portion that sets the random test signals which are subsequently transmitted on the basis of test results obtained until right before.

3. The security test system according to claim 1, wherein the function evaluation unit further includes a test condition setting portion that sets states in which the control device may be placed on the on-vehicle network as test conditions, and transmits the test conditions to the control device.

4. The security test system according to claim 1, wherein the test signal transmission portion of the security test unit transmits the test signals to the control device and the function evaluation unit, and the abnormality information output portion of the function evaluation unit excludes a test signal corresponding to a normal process result, and outputs information regarding a test signal corresponding to an abnormal process result.

5. The security test system according to claim 1, wherein the abnormality information output portion of the function evaluation unit transmits the information regarding the abnormality to the security test unit.

6. The security test system according to claim 1, wherein the abnormality information output portion of the function evaluation unit stores the information regarding the abnormality in a storage portion provided in the function evaluation unit.

7. The security test system according to claim 1, wherein the on-vehicle network is a controller area network (CAN), a local interconnect network (LIN), FlexRay, Media Oriented Systems Transport (MOST), CAN with Flexible Data rate (CAN-FD), or Automotive Ethernet.

8. The security test system according to claim 1, wherein, when a transmission frequency of an output signal which is output as a process result in the control device exceeds an expected frequency, the abnormality detection portion of the function evaluation unit detects abnormality in the process result.

9. The security test system according to claim 1, wherein, when a voltage value of output signal which is output as a process result in the control device or an input signal which is input to the control device is more than an expected upper limit or is lower than an expected lower limit, the abnormality detection portion of the function evaluation unit detects abnormality in the process result.

10. The security test system according to claim 1, wherein, when a frequency of an output signal which is output as a process result in the control device or an input signal which is input to the control device exceeds an expected frequency, the abnormality detection portion of the function evaluation unit detects abnormality in the process result.

11. The security test system according to claim 1, wherein the abnormality detection portion of the function evaluation unit detects abnormality in a process result on the basis of imaging information obtained by imaging a display device which performs display control on the basis of the process result in the control device.

12. The security test system according to claim 11, wherein, when a contradictory display on the display device is detected on the basis of the imaging information, the abnormality detection portion of the function evaluation unit detects abnormality in the process result.

13. The security test system according to claim 1, wherein, when a change amount of a predetermined value per unit time related to a process result in the control device exceeds an expected threshold value, the abnormality detection portion of the function evaluation unit detects abnormality in the process result.

14. The security test system according to claim 1, wherein, when an unchangeable value included in a memory address in the control device is overwritten as a process result in the control device, the abnormality detection portion of the function evaluation unit detects abnormality in the process result.

15. A security test method for a control device for an on-vehicle network, the method comprising:

causing a security test unit to transmit, over a first electrical bus, random test signals, including an illegal signal, for diagnosing security of a control device for the on-vehicle network;

causing a function evaluation unit to acquire, over a second electrical bus, information regarding a process result in the control device;

causing the function evaluation unit to detect abnormality in a process result in the control device based on the test signal;

causing the function evaluation unit to store information regarding the detected abnormality or transmit the information regarding the detected abnormality to the security test unit; and causing the security test unit to specify the illegal signal on the basis of the process result in the control device based on the test signal, wherein the first bus simulates a shared communication bus in the on-vehicle network, and the second bus provides the function evaluation device with direct access to the process result apart from the simulated shared communication bus.

16. A function evaluation device for a control device for an on-vehicle network, the function evaluation device comprising:

a process information acquisition portion that acquires, via a second electrical bus, information regarding a process result in a control device for an on-vehicle network;

an abnormality detection portion that detects abnormality in a process result in the control device due to random test signals including an illegal signal, the random test signals being transmitted to the control device from a security test unit diagnosing security of the control device via a first electrical bus; and an abnormality information output portion that outputs information regarding the detected abnormality, wherein the first bus simulates a shared communication bus in the on-vehicle network, and the second bus provides the function evaluation device with direct access to the process result apart from the simulated shared communication bus.

* * * * *